United States Patent
Kato et al.

(10) Patent No.: US 9,851,674 B2
(45) Date of Patent: Dec. 26, 2017

(54) DISPLACEMENT DETECTOR AND IMAGE FORMING DEVICE HAVING THE SAME

(71) Applicant: KONICA MINOLTA, INC., Chiyoda-ku, Tokyo (JP)

(72) Inventors: Takaki Kato, Toyoake (JP); Yuji Kobayashi, Toyohashi (JP); Masayuki Fukunaga, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/422,881

(22) Filed: Feb. 2, 2017

(65) Prior Publication Data
US 2017/0227906 A1 Aug. 10, 2017

(30) Foreign Application Priority Data

Feb. 8, 2016 (JP) ................................. 2016-021926

(51) Int. Cl.
*G03G 15/00* (2006.01)
*G01S 17/06* (2006.01)

(52) U.S. Cl.
CPC .......... *G03G 15/5062* (2013.01); *G01S 17/06* (2013.01)

(58) Field of Classification Search
CPC ...... G03G 15/5062; G01S 17/06; G02B 27/48
See application file for complete search history.

(56) References Cited

U.S. PATENT DOCUMENTS

| 2010/0310284 A1* | 12/2010 | Funato | G01P 3/68 |
| | | | 399/302 |
| 2011/0102850 A1 | 5/2011 | Watanabe | |
| 2016/0338592 A1* | 11/2016 | Masumura | G01N 21/4795 |

FOREIGN PATENT DOCUMENTS

| JP | 2002-071310 A | 3/2002 |
| JP | 2011-093241 A | 5/2011 |
| | (Continued) | |

OTHER PUBLICATIONS

Mitamura et al., "A Speckle Reduction Filter Using Contrast Information", Bulletin of the Faculty of Engineering, Hokkaido University, No. 164, (Hokkaido University, May 28, 1993) p. 49-54, with English abstract, http://hdl.handle.net/2115/42361.

(Continued)

*Primary Examiner* — Clayton E Laballe
*Assistant Examiner* — Jas Sanghera
(74) *Attorney, Agent, or Firm* — Buchanan Ingersoll & Rooney PC

(57) ABSTRACT

An emission unit of a displacement detector emits laser light to a range in a space in which a target moves. A detection unit detects a distribution of amounts of light reflected from a capture region in the predefined range. Based on a shift of speckle pattern indicated by a difference between the distributions of amounts of reflected light that the detection unit detects at different times, a calculation unit calculates a displacement of the target. A correction unit measures a speckle contrast from the distribution of amounts of reflected light, and based on an error between the measured value and a reference value, corrects the amount of laser light. The reference value is set to the value of a speckle contrast in a case in which the amounts of reflected light fall within the detectable range of the detection unit.

13 Claims, 16 Drawing Sheets

(56) References Cited

FOREIGN PATENT DOCUMENTS

| JP | 2013-144604 A | 7/2013 |
|----|---------------|--------|
| JP | 2015-068809 A | 4/2015 |

OTHER PUBLICATIONS

Asakura, et al. "Laser Speckle Kenkyu no Tenkai (in Japanese)" Research for Electronic Science, vol. 4 (Research Institute for Electronic Science Hokkaido University, Feb. 1997), p. 3-12, http://hdl.handle.net/2115/24368.

* cited by examiner

DISPLACEMENT DETECTOR AND IMAGE FORMING DEVICE HAVING THE SAME

This application is based on an application No. 2016-021926 filed in Japan, the contents of which are hereby incorporated by reference.

BACKGROUND OF THE INVENTION

1. Field of the Invention

The invention relates to control of a movable member and control of object conveyance, and in particular to determining a displacement of the movable member and object.

2. Background

In order to increase productivity, image forming devices such as printers and copiers are required to further speed up while keeping high print quality. To respond to such a request, the devices need further highly accurate control of movable members and sheet conveyance; The movable members include conveyance rollers and a rotatable image carrier such as a photoreceptor drum and an intermediate transfer belt. One idea for an increase in accuracy of the control is to more precisely and rapidly determine a shift or velocity (hereinafter, referred to collectively as "displacement") of a target, e.g. one of the movable members and sheets.

In highly precise and rapid determination of a displacement, optical detectors have an advantage, and in particular, those of a type with an image sensor are promising. See, for example, JP 2015-068809, JP 2013-144604, JP 2011-093241, and JP 2002-071310. A detector of this type uses an image sensor, such as complementary metal-oxide semiconductor field effect transistors (CMOS) or a charge coupled device (CCD), to capture a continuous series of images of a target, and from the differences between two of the images, calculate a displacement of the target. In general, a detector of the type that captures from the images finer shapes of the target achieves a higher degree of precision.

Recently, use of speckle pattern has been attracting attention as a promising means for determining a displacement with a higher degree of precision. "Speckle" means interference of coherent light diffusely reflected by irregularities in the size not lower than the wavelength of the light. See, for example, "A Speckle Reduction Filter Using Contrast Information," Tomoyuki MITAMURA, Hideo KITAJIMA, Tomoaki SHIRAKAWA, and Yoshihiko OGAWA, Bulletin of the Faculty of Engineering, Hokkaido University, No. 164, (Hokkaido University, May 28, 1993) pp. 49-54, http://hdl.handle.net/2115/42361; "Laser Speckle Kenkyu no Tenkai (in Japanese)," Toshimitsu ASAKURA and Jun UOZUMI, Research for Electronic Science, Vol. 4 (Research Institute for Electronic Science Hokkaido University, February 1997), pp. 3-12, http://hdl.handle.net/2115/24368. This interference of light provides the distribution of amounts of the reflected light with "speckle pattern," i.e. distortions in striped or dotted pattern that corresponds to the shape of fine irregularities on the reflecting surface. The speckle pattern is used in displacement determination as follows. See, for example, JP 2015-068809 and JP 2013-144604. A light emitted from a semiconductor laser is used to capture images of a target. In general, this light has a wavelength of 0.1 µm-1 µm, and the target has a surface roughness of 1 µm or more, and thus, speckle pattern appears in each image of the target. Since the speckle pattern reflects the fine structure of the target's surface, the speckle pattern of each image has a correlation with that of the next image, and a coefficient of the correlation is distributed in each image with a peak. Caused by the moving target, the peak is shifted in the next image from the location where the peak would appear if the target were at rest. The ratio of the shift amount of the peak to the magnification of the optical system on the side of the image sensor is used to determine the displacement of the target. Such a use of speckle pattern can increase precision of the displacement to the surface roughness of the target, i.e. to micrometer precision.

SUMMARY OF THE INVENTION

Optical reflectivity varies with paper types, such as plain, high-quality, plastic-film, and cured-resin. This is a problem with the use of speckle pattern in determination of the shift amount of a sheet. Indeed, difference in reflectivity causes difference in maximum, minimum, and average amount of reflected light indicated by speckle pattern. Furthermore, some paper types might allow the maximum or minimum amount of reflected light to escape the dynamic range of the image sensor. In such a case, the portion of speckle pattern that indicates the true values of reflected light amounts spread out of the dynamic range of the image sensor is assigned a constant value fixed to an upper or lower limit of the dynamic range as a measured value of reflected light amount. This entails loss of the correlation between different images, thus causing an error in the location of the peak of the correlation coefficient.

Reduction of error in displacement caused by differences in optical reflectivity between different paper types requires a technique of making both the maximum and minimum amounts of reflected light indicated by speckle pattern fall within the dynamic range of the image sensor. For example, according to a photoelectric displacement measuring device disclosed in JP 2002-071310, if its CCD includes a light-receiving cell with a saturated output, it first extrapolates a true value to be indicated by the saturated output from the output of other cells, thus estimating a peak value of the outputs of all the cells. The device next reduces the light amount of its light-emitting element to an amount that depends on the difference between the estimated peak value and the median value of an acceptable range for the output of a cell. Since the acceptable range corresponds to the dynamic range of the CCD, the above-described action of the device decreases the maximum amount of light received by the CCD to a value no more than the upper limit of the dynamic range. This action, however, cannot ensure that the minimum amount of light received by the CCD is kept at a value no less than the lower limit of the dynamic range.

An object of the invention is to solve the above-mentioned problems, and in particular, to provide a displacement detector that can determine displacements of any targets regardless of differences in light reflectivity with a high degree of accuracy.

A displacement detector according to one aspect of the invention is a displacement detector for detecting a displacement of a target, which is a movable member mounted in a device equipped with the displacement detector, or an object carried by the device. The displacement detector comprises an emission unit configured to emit a variable amount of laser light to a predefined range in a space in which the target moves; a detection unit configured to set a capture region in the predefined range and detect a distribution of amounts of laser light reflected from the capture region; a calculation unit configured to make the emission unit repeatedly emit laser light, make the detection unit repeatedly detect a distribution of amounts of reflected light, and, based on a shift of speckle pattern indicated by a difference between the distributions of amounts of reflected light detected at different times, calculate a displacement of the target; and a correction unit configured to measure a speckle contrast from one of the distributions of amounts of reflected light, and, based on an error between the measured value and a reference value, correct the amount of laser light to be emitted. The correction unit sets the reference value to the value of a speckle contrast in a case in which the amounts of light reflected from the capture region have a maximum no more than an upper limit of the detectable range of the detection unit and a minimum no less than a lower limit of the detectable range.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the drawings.

DETAILED DESCRIPTION

The following is a description of embodiments of the invention with reference to the drawings.

Appearance of Image Forming System

Figure 1:
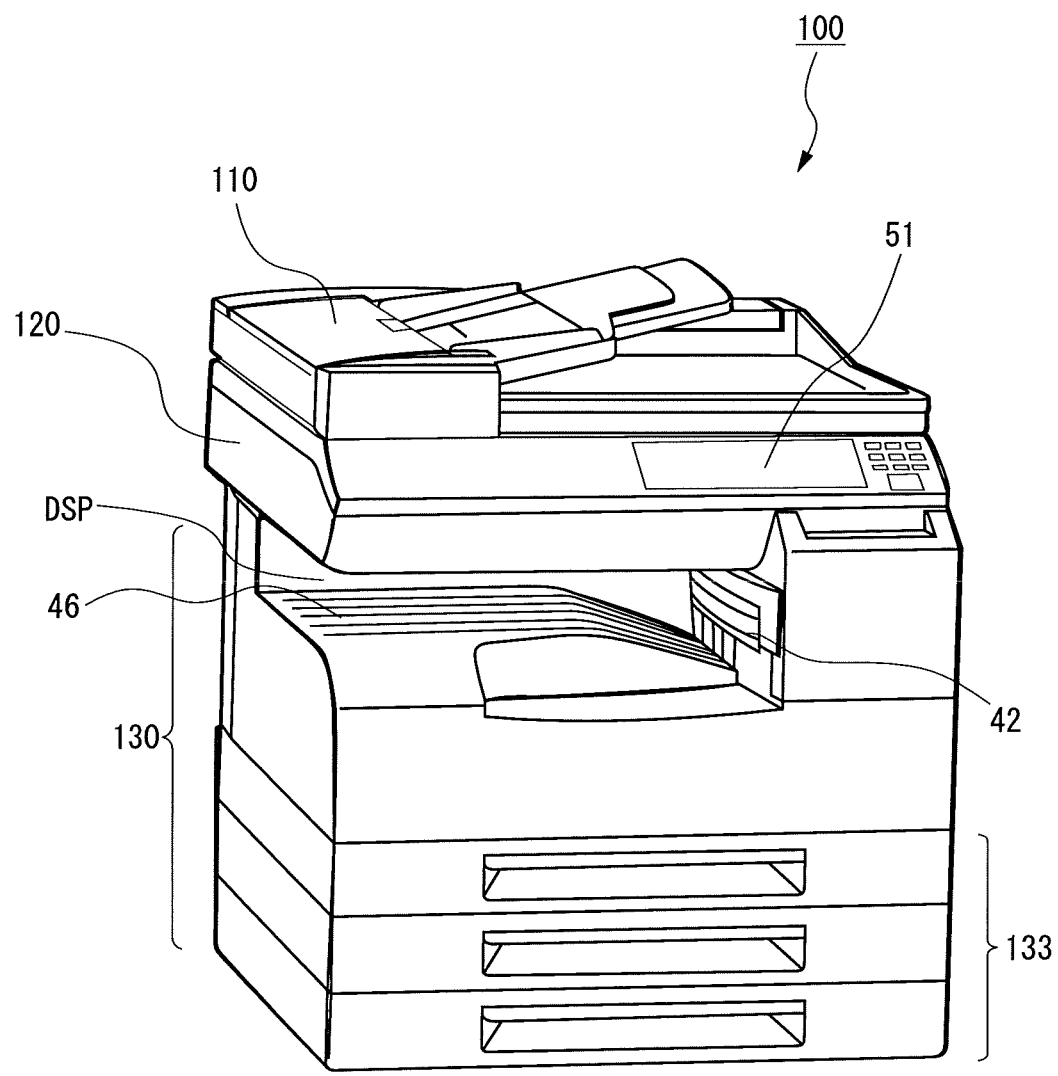
FIG. 1 is a perspective view of the appearance of an image processing device according to an embodiment of the invention.

FIG. 1 is a perspective view of the appearance of an image forming system according to an embodiment of the invention. The image forming system 100 is a multi-function peripheral (MFP), which combines functions of a scanner, color copier, and color laser printer. Referring to FIG. 1, the MFP 100 has, on the top surface of its body, an auto document feeder (ADF) 110 mounted in an openable and closable manner, and an operation panel 51 is embedded in front of the ADF 110. In an upper portion of the body directly below the ADF 110, the MFP 100 houses a scanner 120, and in a lower portion of the body, it includes a printer 130 with a lower portion to which paper cassettes 133 are attached to be able to slide out like drawers. The MFP 100 is of an in-body paper ejection type, i.e. it has, in a space DSP between the scanner 120 and the printer 130, an ejection tray 150 to which the MFP 100 ejects sheets from an ejection slot 42 located deep in the space DSP.

Internal Configuration of Printer

Figure 2:
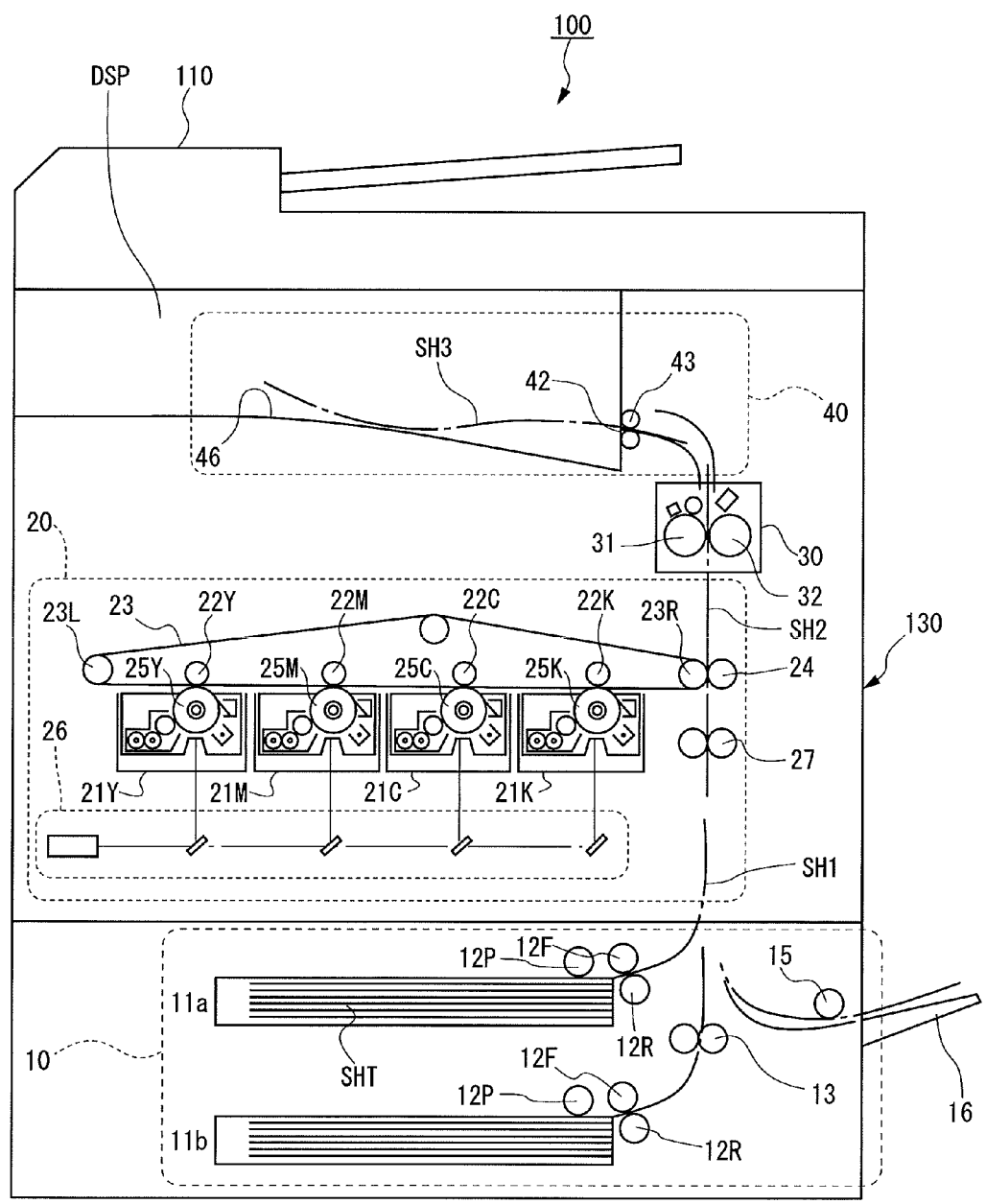
FIG. 2 is a front view schematically illustrating an internal configuration of the printer in FIG. 1.

FIG. 2 is a front view illustrating a schematic internal configuration of the printer 130. FIG. 2 represents elements of the printer 130 as if they can be seen through the front face of the body. Referring to FIG. 2, the printer 130 includes a feeder section 10, an imaging section 20, a fixing section 30, and an ejecting section 40.

The feeder section 10 uses feeder rollers 12P, 12F, 12R, 13, 15 to feed each sheet SH1 from a stack of sheets SHT stored in the paper cassettes 11a, 11b, or on a manual feed tray 16 to the imaging section 20. The material of the sheets SHT is paper or resin; their paper type is plain, high-quality, coated, etc.; and their size is A3, A4, A5, B4, etc. They can be stored in the longitudinal or transverse position.

The imaging section 20 forms a toner image on a sheet SH2 conveyed from the feeder section 10. More specifically, at first, a timing roller 27 stops a sheet from either of the paper cassettes 11a, 11b or the manual feed tray 16, and then transfers the sheet to the nip between an intermediate transfer belt 23 and a secondary transfer roller 24 at the time indicated by a driving signal from a below-mentioned main controller section 60, cf. FIG. 4. In parallel to the action, four imaging units 21Y, 21M, 21C, 21K expose surfaces of their respective photoreceptor drums 25Y, 25M, 25C, 25K to laser lights from an exposure unit 26 in patterns based on image data, then form electrostatic latent images on the surfaces. From the electrostatic latent images, the imaging units 21Y, . . . , 21K next develop toner images of their respective colors, i.e. yellow (Y), magenta (M), cyan (C), and black (K). The imaging units 21Y, . . . , 21K then transfer the resultant four one-colored toner images in order by electric fields between primary transfer rollers 22Y, 22M, 22C, 22K and the photoreceptor drums 25Y, . . . , 25K, from the photoreceptor drums 25Y, . . . , 25K onto the same position on a surface of the intermediate transfer belt 23, thus forming a single four-colored toner image on the position. The imaging section 20 further transfers this color toner image by an electric field between the intermediate transfer belt 23 and the secondary transfer roller 24, onto a surface of the sheet SH2 passing through the nip between the intermediate transfer belt 23 and the secondary transfer roller 24. After that, the secondary transfer roller 24 sends the sheet SH2 to the fixing unit 30.

The fixing section 30 thermally fixes the color toner image to the sheet SH2 conveyed from the imaging section 20. More specifically, when the sheet SH2 passes through the nip between a fixing roller 31 and a pressure roller 32, the fixing roller 31 applies heat from its built-in heater to the sheet SH2, and the pressure roller 32 applies pressure to the heated portion of the sheet SH2, pressing the sheet SH2 against the fixing roller 31. The heat from the fixing roller 31 and the pressure from the pressure roller 32 fix the toner image onto a surface of the sheet SH2.

The ejecting section 40 ejects a sheet on which a toner image is fixed. Referring to FIG. 2, the ejecting section 40 includes an ejection slot 42 and an ejecting roller 43. The ejection slot 42 is a horizontally elongated slot, which is open at a portion of the body of the MFP 100 faced to the space DSP. The ejecting roller 43 is disposed inside of the ejection slot 42, and by its rotating outer periphery, ejects a sheet SH3 coming from the top portion of the fixing section 30 through the ejection slot 42 and stores it on the ejection tray 46.

Conveyance Path of Sheets

Figure 3:
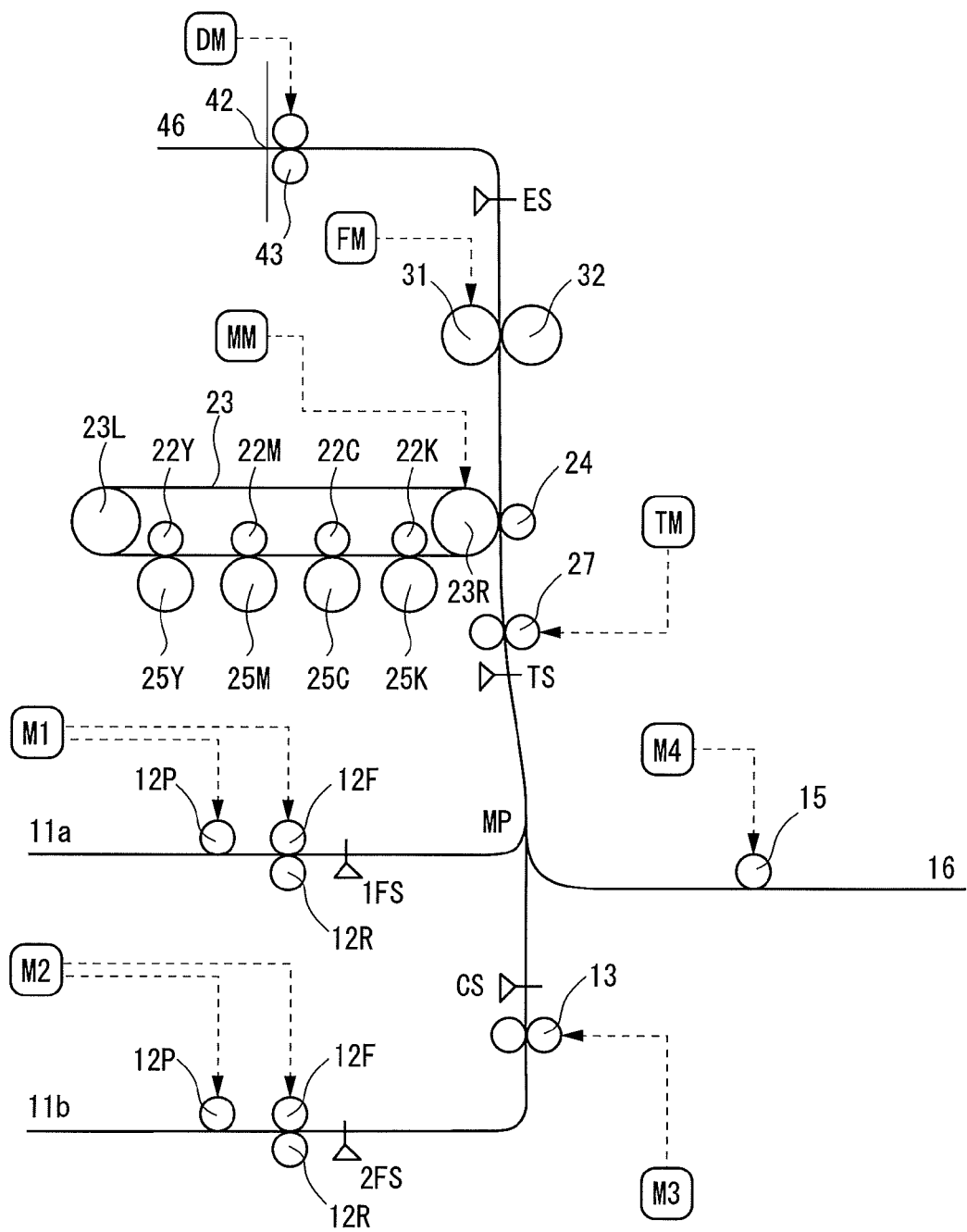
FIG. 3 is a schematic diagram illustrating a sheet conveyance path in the image forming device shown in FIG. 1.

FIG. 3 is a schematic diagram showing conveyance paths of sheets in the printer 130. Referring to FIG. 3, these paths include, in addition to the group of conveyance rollers 12P, 12F, . . . , shown in FIG. 2, a plurality of paper sensors 1FS, 2FS, CS, TS, and ES. Each of the paper sensors 1FS, . . . , ES monitors a sheet passing through a nearby portion of the paths. More concretely, each sensor is an optical sensor, which includes an emitting unit and a detecting unit. The emitting unit emits light of a predefined wavelength such as infrared light. The detecting unit detects light of the wavelength. While passing through the portion that each of the sensors 1FS, . . . , ES monitors, a sheet interrupts the light from its emitting unit before the detecting unit or reflects it to the detecting unit. In response to this interruption or reflection, the detecting unit changes its output, and thus the sensor detects the sheet as passing through the portion that it monitors.

Information on the detection of sheets by the paper sensors 1FS, . . . , ES is transferred by the feeder section 10, imaging section 20, fixing section 30, and ejecting section 40 to the main controller section 60. In response to the information, the main controller section 60 determines whether or not a paper jam occurs, i.e. whether or not the conveyance time of sheets is delayed by more than a threshold length. If a jam occurs, the main controller section 60 performs an error process such as an abort of the process by the MFP 100 or notification of the jam to a user by the display of the operation panel 51.

Feeder sensors 1FS, 2FS are placed at the start ends of the conveyance paths that are located near the paper cassettes 11a, 11b, respectively. Depending on whether or not the outputs of these sensors 1FS, 2FS indicate delay of a sheet passing, it is determined whether or not the group of feeder rollers 12P, 12F, and 12R feeds the sheet to the path at the proper time.

The path from the second paper cassette 11b includes, in addition to the vertical conveyance roller 13, a vertical conveyance sensor CS placed before the point MP where the path merges with another path 11a from the first paper cassette 11a. Depending on whether or not the output of this sensor CS indicates that the passage of a sheet is delayed by more than a threshold time length, it is determined whether or not the roller 13 sends the sheet to the merge point MP at the proper time. This threshold time length is predefined based on fluctuation of the time required for the feeder section 10 to move a sheet from the second paper cassette 11b to the position that the sensor CS monitors.

Near the boundary between the feeder section 10 and the imaging section 20, a timing sensor TS, as well as the timing roller 27, is placed downstream of the merge point MP where the paths from the paper cassettes 11a, 11b merge with the path from the manual feed tray 16. Depending on whether or not the output of this sensor TS indicates that the passage of a sheet is delayed by more than a threshold time length, it is determined whether or not the sheet reaches the roller 27 at the proper time and whether or not it is transferred from the roller 27 at the proper time. This threshold time length is predefined based on fluctuation of the time required for the feeder section 10 to move a sheet from the paper cassettes 11a, 11b, etc. to the position that the sensor TS monitors.

Between the fixing section 30 and the ejection slot 42, an ejection sensor ES is placed. Depending on whether or not the output of this sensor ES indicates that the passage of a sheet is delayed by more than a threshold time length, it is determined whether or not the fixing roller 31 transfers the sheet at the proper time and whether or not the ejecting roller 43 draws the sheet at the proper time. This threshold time length is predefined based on fluctuation of the time required for the fixing section 30 and the ejecting section 40 to move a sheet from the fixing section 30 to the ejection slot 42.

Referring further to FIG. 3, a group of motors M1, M2, M3, M4, TM, MM, FM, DM for driving the conveyance rollers 12P, 12F, . . . , is provided around the conveyance paths. Each of the motors M1, M2, . . . , is a brushless direct current motor (BLDC), which exerts torque through a transmission system such as gears and belts to a roller to be driven. Near the paper cassettes 11a, 11b, the feeder motors M1, M2 rotate the pickup roller 12P, feeder roller 12F, and separator roller 12R. Near the path from the second paper cassette 11b, the vertical conveyance motor M3 rotates the vertical conveyance roller 13. Near the path from the manual feed tray 16, the feeder motor M4 rotates the feeder roller 15. Near the boundary between the feeder section n10 and the imaging section 20, the timing motor TM rotates the timing roller 27. In the imaging section 20, the main motor MM rotates the driving roller 23R for the intermediate transfer belt 23. In the fixing section 30, the fixing motor FM rotates the fixing roller 31 and the pre-ejecting roller 33. In the ejecting section 40, the ejection motor DM rotates the ejecting roller 43.

Electronic Control System of Image Forming System

Figure 4:
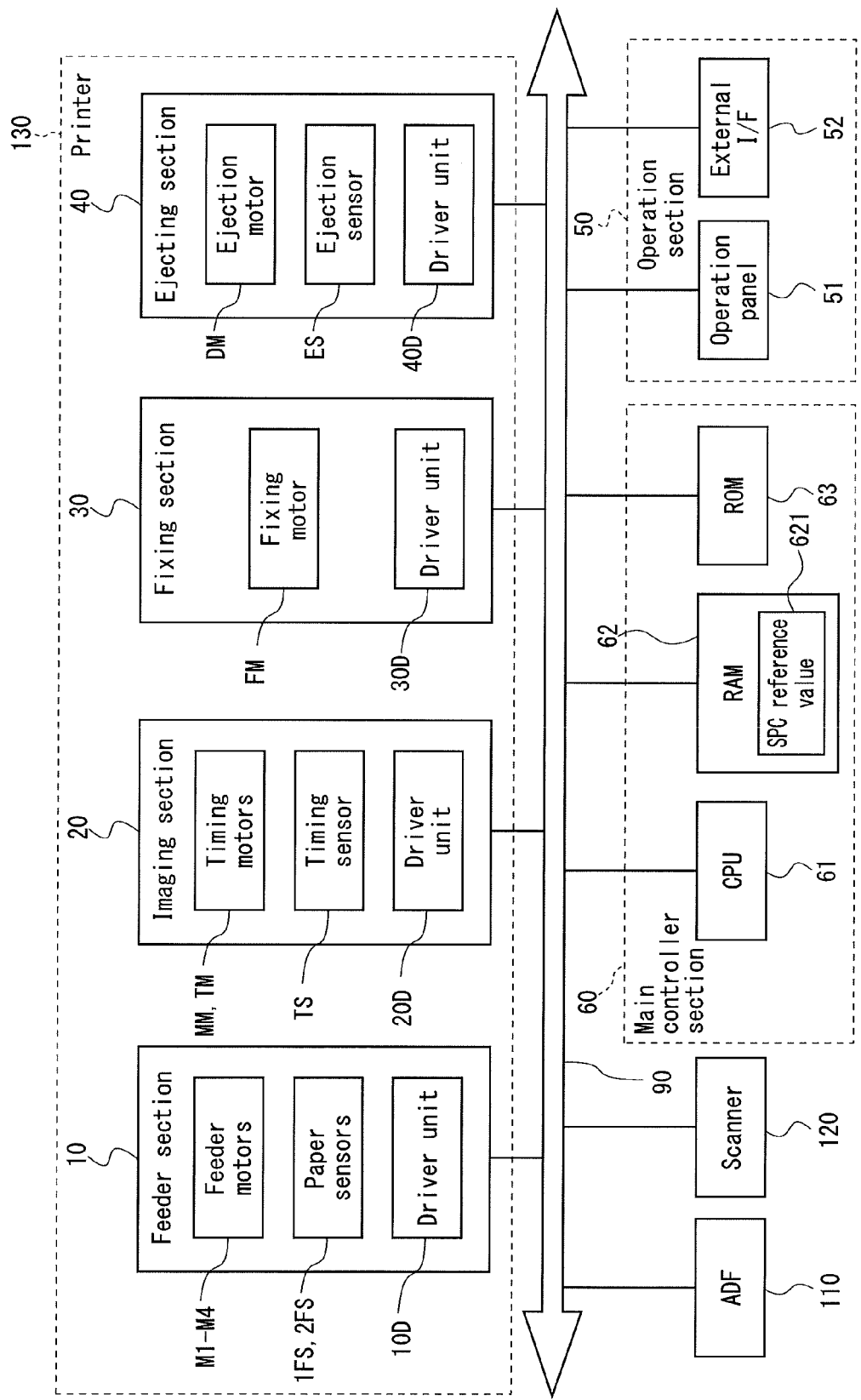
FIG. 4 is a block diagram illustrating a configuration of the electronic control system of the image forming device in FIG. 1.

FIG. 4 is a block diagram illustrating a configuration of the electronic control system of the WY 100. Referring to FIG. 4, this system includes, in addition to the ADF 110, scanner 120, and printer 130, an operation section 50 and a main controller section 60, which are connected to a bus 90 to be able to communicate with each other.

—Driver Unit of Printer—

The elements 10, 20, 30, 40 of the printer 130 include their respective driver units 10D, 20D, 30D, 40D, which control the conveyance rollers 12P, 12F, 12R, 23R, 27, 31, 43 and other actuators for various movable members. Though not shown in FIG. 4, each driver unit 10D, ..., 40D includes a control circuit and a driving circuit, in addition to the motors M1, M2, ..., shown in FIG. 3. The control circuit, which is configured with an integrated circuit such as a microprocessor (MPU/CPU), an application specific integrated circuit (ASIC), or a field programmable gate array (FPGA), instructs the driving circuit about the level of voltage to be applied to the motor based on an actual rotation speed fed back from the motor. The driving circuit is an inverter, which uses switching elements such as power transistors (FET) to apply a voltage to the motor. By feedback control using the control and driving circuits, each driver unit 10D, ..., 40D maintains the sheet conveyance speed for the conveyance rollers 12P, ..., ES at a target value indicated by the main controller section 60.

The driver units 10D, ..., 40D further use various sensors to monitor operating conditions of the elements 10-40 of the printer 130 and conveyance conditions of sheets. If detecting any failure from the conditions, the units 10D, ..., 40D inform the main controller section 60 of the failure. These sensors include, in addition to the paper sensors 1FS, 2FS, ..., shown in FIG. 3, a position sensor for detecting a location or position of a movable member such as the photoreceptor drum 25Y, ..., 25K or the fixing roller 31, a temperature sensor for detecting overheating of a motor for driving the movable member or its driving circuit, a sensor for detecting paper shortage in the paper cassettes 11a, 11b, and a sensor for detecting toner shortage in the imaging units 21Y, ..., 21K.

—Operation Section—

The operation section 50 accepts requests of jobs and image data to be printed through use operations or communication with external electronic devices, and informs the main controller section 60 of them. Referring to FIG. 4, the operation section 50 includes the operation panel 51 and an external interface (I/F) 52. The operation panel 51 includes push buttons, a touch panel, and a display unit as shown in FIG. 1. The operation panel 51 reproduces on the display unit a GUI screen such as an operation screen and an input screen for various parameters. The operation panel 51 also identifies a push button that a user presses, or detects a position on the touch panel where a user touches, then provides the main controller section 60 with information about the identification or detection as operation information. Especially when reproducing the input screen for a print job on the display, the operation panel 51 accepts, from a user, conditions about a print such as the size and paper type of sheets to be printed, the longitudinal or transverse position of them, the number of them, selection between color and monochrome, and the image quality of them. The operation panel 51 incorporates items indicating these conditions into operation information. The external I/F 52 includes a universal serial bus (USB) port or memory card slot, and through it reads image data to be printed directly from an external memory device such as a USB memory or a hard disk drive (HDD). The external I/F 52 also has a wired or wireless connection to an external network (not shown in FIG. 4), and receives image data to be printed from another electronic device on the network.

—Main Controller Section—

The main controller section 60 is an integrated circuit implemented on a printed circuit board, which is mounted inside the MFP 100. Referring to FIG. 4, the main controller section 60 includes a CPU 61, a RAM 62, and a ROM 63. The CPU 61, which is configured with a single MPU, executes a variety of firmware to realize various functions of control over the other elements 50, 110, 120, and 130. For example, the CPU 61 makes the operation section 50 display a GUI screen such as the operation screen and accept user's input operation. In response to each input operation, the CPU 61 selects an operation mode of the MFP 100 such as a running, waiting (low-power), or sleep mode, and instructs processes according to the operation mode to the other elements 110, 120, 130. In particular, the CPU 61 selects a target value of the sheet conveyance speed and indicates it to the driver units 10D, ..., 40D of the elements 10, ..., 40 of the printer 130. The RAM 62, which is a volatile semiconductor memory device such as a dynamic RAM (DRAM) and a static RAM (SRAM), provides the CPU 61 with a workspace to execute firmware and stores image data to be printed that the operation section 50 accepts. The ROM 63 consists of a non-writable, non-volatile memory device and a rewritable non-volatile memory device. The former stores firmware; the latter includes a semiconductor memory device such as EEPROM, flash memory, or solid state drive (SSD), or a HDD, and provides the CPU 61 with storage for data such as environmental variables.

The main controller section 60 further monitors the operating conditions of the elements 110, 120, 130 of the MFP 100, and if detecting any failure of them, changes operating modes to appropriately resolve the failure. Especially when informed of a delay of sheet conveyance from the driver unit 10D, ..., 40D of the printer 130, the main controller section 60 responds to the information by aborting the printer 130 and instructing the operation panel 51 to display a message saying "a paper jam occurred" and urge a user to remove the jam. The main controller section 60 also responds in a similar manner when informed of overheating of one of the motors M1, M2, ..., for driving the conveyance rollers, its driving circuit, or the fixing roller 31, paper shortage in the paper cassette 11a or 11b, or toner shortage in the imaging units 21Y, ..., 21K.

Structure of Displacement Sensor

Of the conveyance rollers shown in FIG. 3, the feeder roller 12F and the timing roller 27 especially need to be controlled with high precision and at a high rate. The control of these rollers 12F, 27 makes the time when and the speed at which a sheet enters into the nip between the intermediate transfer belt 23 and the secondary transfer roller 24 coincide with the time when and the speed at which a toner image on the intermediate transfer belt 23 passes through the nip. More precise coincidence between these times and speeds entails the toner image located at a proper position on the sheet with a higher degree of accuracy and with higher image quality.

In order to achieve a further higher degree of accuracy in drive control of these rollers 12F, 27, a displacement sensor according to an embodiment of the invention is adopted as at least one of the feeder sensors 1FS, 2FS, and the timing sensor TS. The feeder sensors 1FS, 2FS precisely and rapidly determine the displacements of sheets sent by the feeder rollers 12F and feed the displacements back to the driver unit 10D of the feeder section 10, which controls the feeder motors M1, M2. Similarly, the timing sensor TS feeds the displacements of sheets back to the driver unit 20D of the imaging section 20, which controls the timing motor TM. From the displacements, the driver units 10D, 20D calculate the locations and speeds of sheets with high precision and in real time, and thus the drive control of the rollers 12F, 27 achieves a further higher degree of accuracy.

Figure 5A:
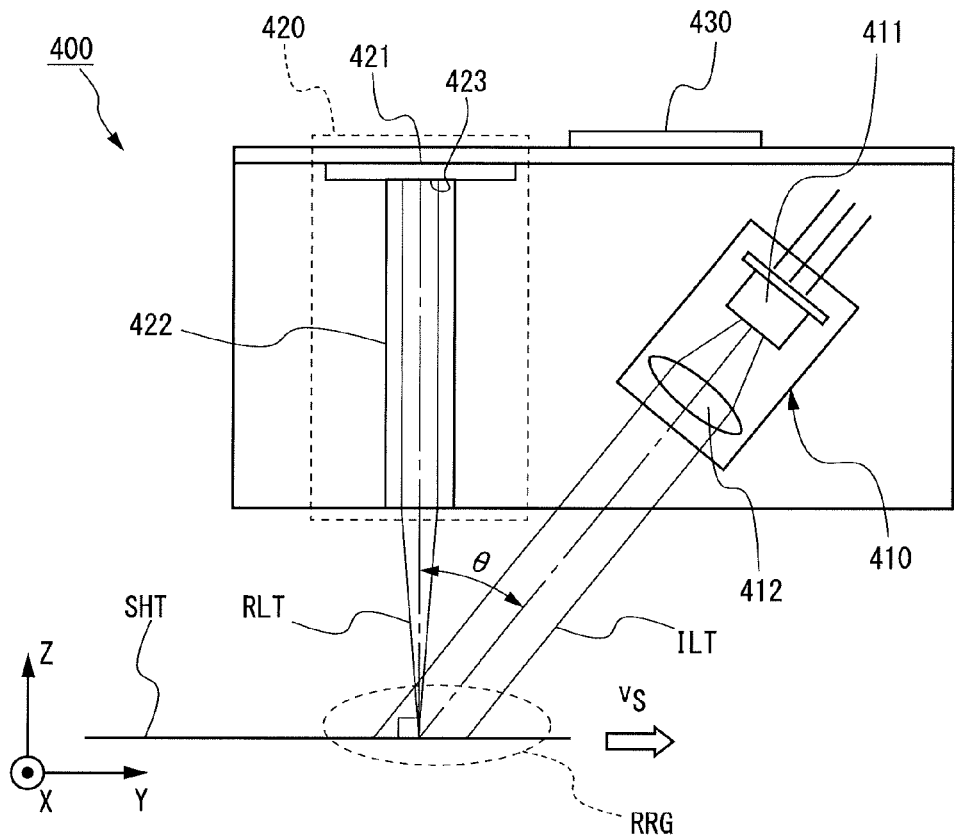
FIG. 5A is a schematic cross-section view showing a configuration of a timing sensor.

FIG. 5A is a schematic cross-section view showing the configuration of the displacement sensor 400. Referring to FIG. 5A, this sensor 400 includes an emission unit 410, detection unit 420, and control unit 430.

The emission unit 410 includes a light source 411 and an optical system 412 on the emission side. The light source 411, which is a semiconductor laser, for example, is located at a distance of 5-10 mm from a path for conveyance of a sheet SHT. The optical system 412, which is one or more collimating lenses, converts the laser light from the light source 411 to a parallel beam ILT and emits it to a predefined range RRG in the path for conveyance of the sheet SHT. A surface of the sheet SHT passing through the range RRG is irradiated with the laser beam ILT diagonally from the front of the sheet SHT. The incident angle θ of the laser beam ILT, i.e. the angle of the laser beam ILT with respect to the normal direction of the surface of the sheet SHT, which is the Z-axis direction in FIG. 5A, is set to 16 degree or less, for example.

The detection unit 420 includes an image sensor element 421 and a telecentric optical system 422. The image sensor element 421, which is a CMOS or CCD, for example, includes a light-receiving surface 423 with a rectangular matrix of 128 by 32 pixels. Each pixel has the size of a $\frac{1}{800}$-inch square, nearly equal to a 32-µm square, and stores charges proportional in amount to incident light. The telecentric optical system 422 converts incident light to a parallel beam, and emits it to the light-receiving surface 423 of the image sensor element 421.

The detection unit 420 sets a capture region CPR within the range RRG to which the light source 411 emits laser light, and the unit 420 positions, at a distance of 7-12 mm from the capture region CPR, for example, the light-receiving surface 423 of the image sensor element 421 parallel to the surface of the sheet SHT and with a longer side of the matrix of pixels parallel to the direction of conveyance of the sheet SHT (in FIG. 5A, the Y-axis direction). Thus, a laser beam RLT that is reflected from the surface of the sheet SHT passing through the capture region CPR to the normal direction of the surface (in FIG. 5A, the Z-axis direction) travels through the telecentric optical system 422 to the light-receiving surface 423 of the image sensor element 421. Accordingly, a charge distribution in the light-receiving surface 423 discretized into cells of a pixel size represents a distribution of amounts of light reflected from the capture region CPR, i.e. the image of the capture region CPR. The detection unit 420, in particular, keeps the size of the capture region CPR such that light reflected from it is irradiated to the entirety of the matrix of pixels.

The control unit 430 is an electronic circuit such as an MPU/CPU, an ASIC, or a FPGA, implemented in one or more chips. The control unit 430 controls the light source 411 and the image sensor element 421 to capture a series of images of the surface of the sheet SHT at a constant frequency, e.g. at one-millisecond intervals, while the sheet SHT passes through the capture region CPR. The control unit 430 further compares two each of the series of images to calculate a displacement of the sheet SHT during the interval of capture of the two images.

Figure 5B:
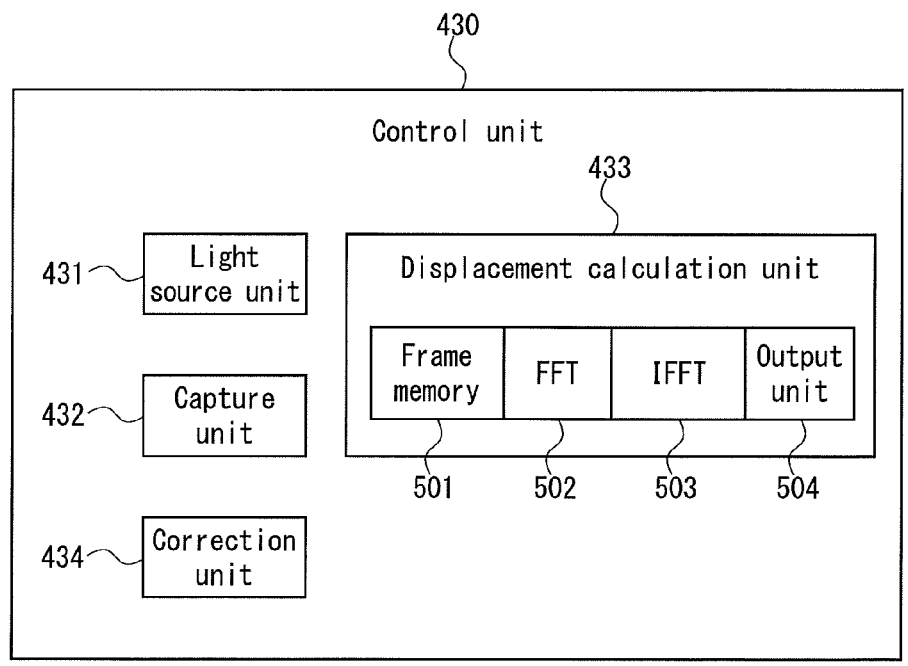
FIG. 5B is a functional block diagram of a control unit mounted in this sensor.

FIG. 5B is a functional block diagram of the control unit 430. Referring to FIG. 5B, the control unit 430 includes a light source unit 431, a capture unit 432, a displacement calculation unit 433, and a correction unit 434. The light source unit 431 is a control circuit for the light source 411. By adjusting current to be supplied to the light source 411, the light source unit 431 keeps the amount of laser light of the light source 411 at a target value for a predefined time of exposure. The capture unit 432 is a control circuit for the image sensor element 421. The capture unit 432 introduces charges stored in each pixel of the image sensor unit 421, and based on the amount of a current flow caused by the introduction, generates data representing a single image, which is hereinafter referred to as a "frame." The capture unit 432 repeats these actions at sampling intervals to produce a series of frames. The displacement calculation unit 433 compares two frames from the series of frames, and thus detects a temporal change of the images. From the change, the displacement calculation unit 433 calculates a displacement of the target. The correction unit 434 measures a speckle contrast from the distribution of amounts of reflected light indicated by each frame. Based on an error between the measured value and a reference value, the correction unit 434 corrects the amount of laser light of the light source 411.

Referring further to FIG. 5B, the displacement calculation unit 433 includes a frame memory 501, a fast Fourier transform (FFT) unit 502, an inverse FFT (IFFT) unit 503, and an output unit 504. The frame memory 501 is a volatile memory device such as a DRAM and SRAM, which can store up to two frames therein. The FFT unit 502 performs FFT on one frame read into the frame memory 501. The IFFT unit 503 calculates the product of two frames after FFT stored in the frame memory 501, and performs IFFT on the product to calculate coefficients of correlation between these two frames. The output unit 504 uses the IFFT unit 503 to search for a peak of the coefficients of correlation between two frames stored in the frame memory 501. From the location of the peak, the output unit 504 calculates a displacement of the sheet, then providing the calculated value to the driver unit 10D, 20D of the feeder section 10 or the imaging section 20.

Action Principle of Displacement Sensor

The displacement sensor 400 continuously captures speckles caused by fine irregularities on the surface of a target. From changes in speckle pattern among a series of images, the displacement sensor 400 measures a displacement of a target with the same precision as the typical scale of speckle pattern, e.g. with a precision of a few micrometers.

Figure 6A:
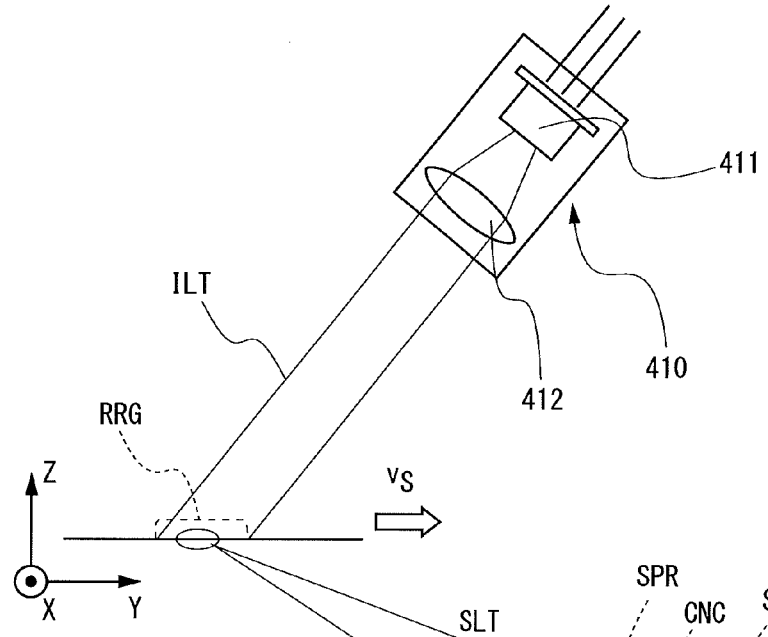
FIG. 6A is a schematic view of fine irregularities on an irradiated area diffusely reflecting light from the light source in FIGS. 5A and 5B.

FIG. 6A is a schematic view of fine irregularities 602 on an irradiated area diffusely reflecting laser beams ILT, which have been emitted from the emission unit 410. When the irradiated area is the surface of a sheet, the irregularities 602 are caused by graded concentration of toner or ink attached to the surface, or undulations of the surface entailed by random alignment of fibers constituting the sheet; the irregularities 602 are typically measured in micrometers. More concretely, when the light source 411 is an infrared semiconductor laser, the laser beam ILT has a wavelength of 700-2000 nm, which is in the same order of magnitude as the size of the irregularities 602, i.e. around 1 µm. Accordingly, speckles appear on the irradiated area, as shown in the enlarged portion of FIG. 6A. Specifically, first domains SPR in which light beams SLT scattered by the irregularities 602 reinforce one another, emit more intense reflected light than other domains; second domains CNC in which scattered light beams SLT cancel one another, emit less intense reflected light than other domains.

Figure 6B:
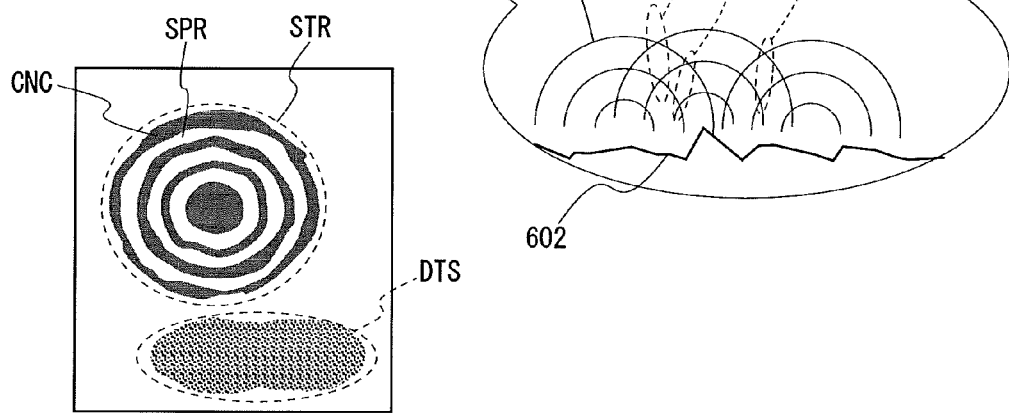
FIG. 6B is a schematic view of speckle pattern appearing on an image captured by the image sensor element in FIGS. 5A and 5B.
Figure 6C:
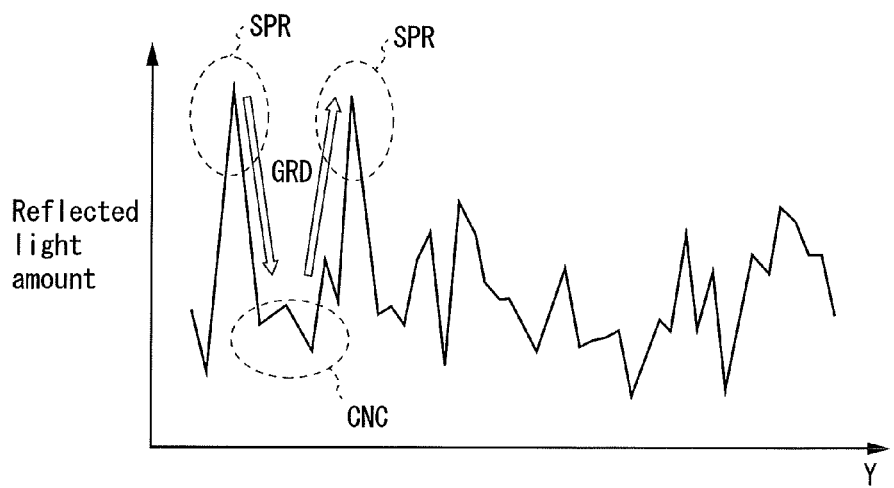
FIG. 6C is a graph of a distribution of reflected light amounts with the speckle pattern.

FIG. 6B is a schematic view of speckle pattern STR appearing on an image captured by the image sensor element 421. FIG. 6C is a graph of a distribution of reflected light amounts with the speckle pattern STR. Since the irregularities 602 on the irradiated area are randomly shaped, the first and second domains SPR, CNC in which the scattered light beams SLT reinforce and cancel one another, respectively, are randomly distributed. Accordingly, as shown in FIG. 6C, peaks and troughs randomly appear in the distribution of reflected light amounts; the peaks are caused by the first domains SPR and the troughs are caused by the second domains CNC. This results in speckle pattern in a form of striped pattern STR or dotted pattern DTS, as shown in FIG. 6B. These patterns STR and DTS reflect the pattern of irregularities 602 on the irradiated area, thus being intrinsic to each local portion of the irradiated area. This enables a feature of the speckle pattern STR or DTS to be used to differentiate local portions of the irradiated area, and in particular, detection of specific speckle pattern STR or DTS within an image can reveal where a corresponding local portion is located within the image.

Figure 7A:
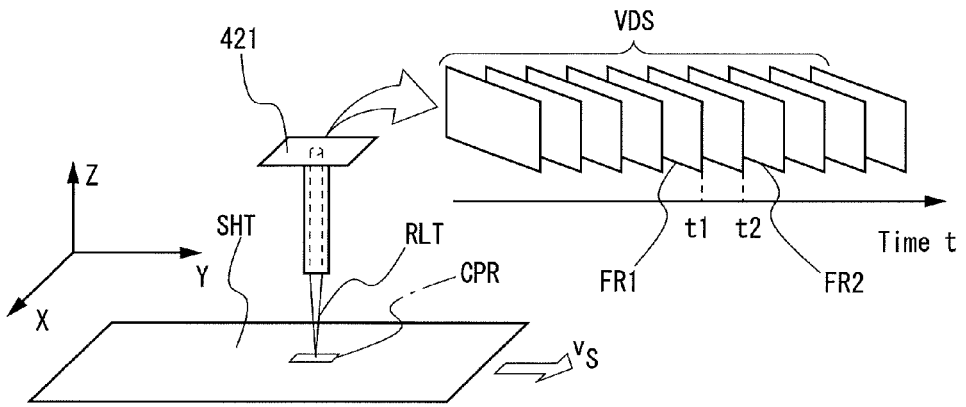
FIG. 7A is a schematic view of a series of images that the image sensor element in FIGS. 5A and 5B has captured at the sampling intervals.

FIG. 7A is a schematic view of a series of images VDS that the image sensor element 421 has captured at the sampling intervals. Referring to FIG. 7A, this series VDS show a shift per sampling interval of the surface of the sheet SHT passing through the capture region CPR. Among the series VDS, the displacement calculation unit 433 detects speckle patterns with a common feature, and thus traces the shift of the pattern within the series.

Figure 7B:
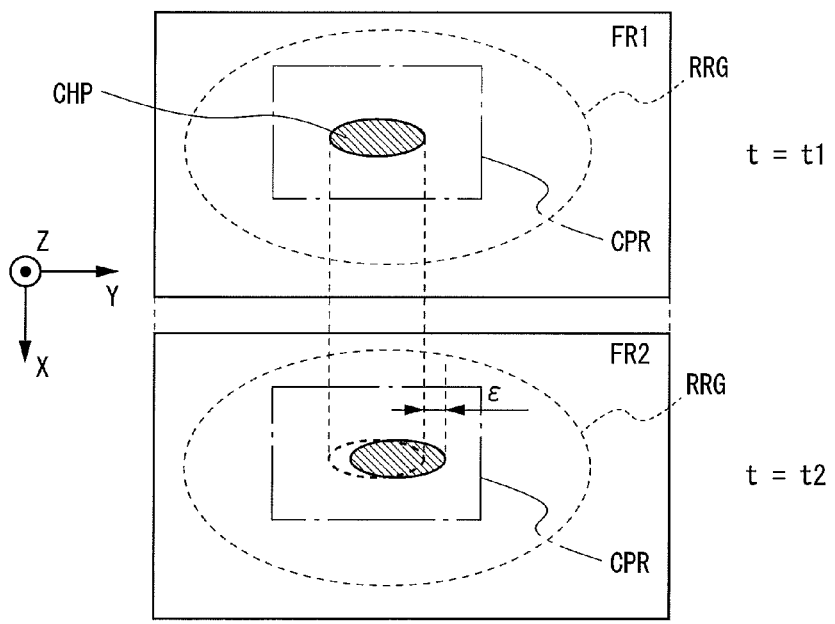
FIG. 7B is a schematic view of the shift of pattern with a common feature between two contiguous images of the series.

FIG. 7B is a schematic view of the shift of pattern CHP with a common feature between two contiguous images FR1, FR2 of the series VDS. Referring to FIG. 7B, one image FR1 shows, within the surface of the sheet SHT, a portion located in the capture region CPR at a first time t=t1, and the other image FR2 shows another portion located in the capture region CPR at a second time t=t2 (>t1). The difference t2−t1 between the first and second times is equal to the length of the sampling interval, e.g. 80 μsec-100 μsec. Even during this tiny difference t2−t1, the sheet SHT travels in the conveyance direction, the Y-axis direction in FIG. 7B. The displacement calculation unit 433 compares brightness distributions between these two images FR1, FR2 to detect portions CHP with the same feature and to determine a displacement $\epsilon$ of the portions within the images. The product of this displacement $\epsilon$ and the magnification of the telecentric optical system 422 is assigned to a displacement of the sheet SHT during the period from the first time t1 to the second time t2.

More concretely, the displacement calculation unit 433 calculates the correlation coefficient of brightness distributions between the two images FR1, FR2 as a function of a distance s between pixels to be compared, which is in general a vector, by the following eq. (1), for example:

$$LM1*LM2(s)=F^{-1}[F[LM(\bullet)]\times F[LM2(\bullet+s)]] \quad (1)$$

The function LM1(•) represents brightness distribution of the image at the first time t1, and the function LM2(•) represents brightness distribution of the image at the second time t2. The transform F[•] for these functions LM1, LM2 represents the Fourier transform for them, and its inverse transform $F^{-1}$[•] represents the inverse Fourier transform for them.

Figure 7C:
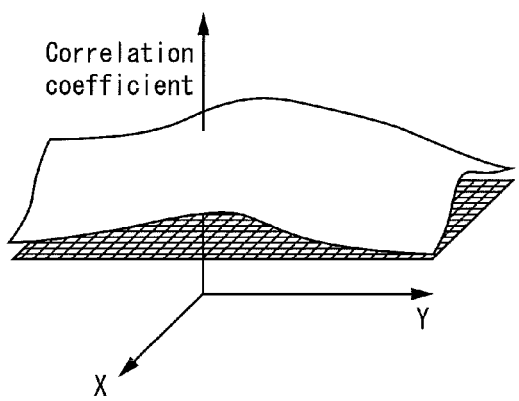
FIG. 7C is a graph showing a distribution of correlation coefficients between the two images.
Figure 7D:
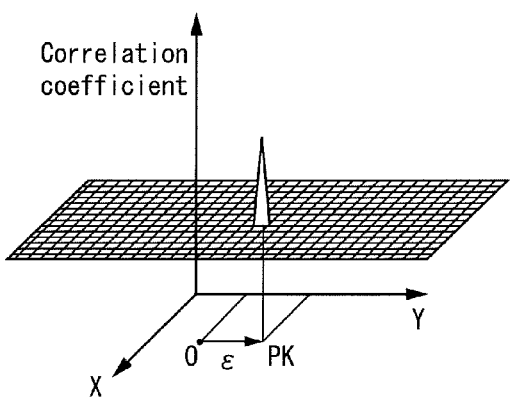
FIG. 7D is a graph showing the distribution after removal of background noise.

FIG. 7C is a graph showing distribution of correlation coefficients LM1*LM2(s) between the two images FR1, FR2, and FIG. 7D is a graph showing the distribution after removal of background noise. Referring to FIGS. 7C and 7D, both the graphs are expressed as a histogram on a pixel-sized mesh. As FIG. 7C shows, the distribution of correlation coefficients calculated from eq. (1) is typically expressed as a curved surface that is smooth but largely undulating throughout each image. Most of the undulation is caused by distributed background noise, and in particular, reflect the variation in intensity of the laser beams ILT. Accordingly, the rate of fluctuation of the background noise is sufficiently lower than the conveyance speed of the sheet SHT. Thus, the brightness distribution F[LM1(•)], F[LM2(•)] of each image FR1, FR2 after Fourier transform is processed with a highpass filter, for example, before the calculation of eq. (1), thus losing its low frequency components. As a result, most of the gradual undulation of the curved surface shown in FIG. 7C is removed as FIG. 7D shows, and then a peak PK appears in the distribution of correlation coefficients.

The position of this peak PK indicates the shift of speckle pattern between the two images FR1, FR2, caused by the moving sheet. Indeed, both the brightness distribution of the images FR1, FR2 represent speckle pattern caused by the irregularities on the same sheet surface, thus including, in general, two or more common forms corresponding to the same local portions of the sheet surface. These common forms indicate shifts between the images FR1, FR2 caused by the sheet SHT that travels for the period from the first time t1 to the second time t2, and thus, all the common forms have the same shift amount (vector) $\epsilon$. Accordingly, both the brightness of a pixel located at a coordinate in the image FR1 at the first time t1 and the brightness of another pixel separated from the same coordinate by the common shift amount $\epsilon$ in the image FR2 at the second time t2 indicate an amount of light reflected from the same local portion of the sheet surface. These pixels correlate closely with each other, and thus, the peak PK of correlation coefficients appears at a location separated from the origin s=0 by the common shift amount $\epsilon$.

The displacement calculation unit 433 calculates the amount $\epsilon$ of shift of the peak PK from the origin s=0, and determines the product of the amount $\epsilon$ and the magnification of the telecentric optical system 422 as a displacement of the sheet SHT from the first time t1 to the second time t2.

Correction of Laser Light Amount by Speckle Contrast

The displacement sensor 400, as described above, uses the speckle pattern in displacement determination for the sheet SHT. In this case, if the light source 411 keeps the laser beam ILT at a constant amount regardless of the differences in light reflectivity between paper types of the sheet SHT, a fluctuated amount of the light RLT reflected from the sheet SHT might fall outside the dynamic range of the image sensor element 421.

Figure 8A:
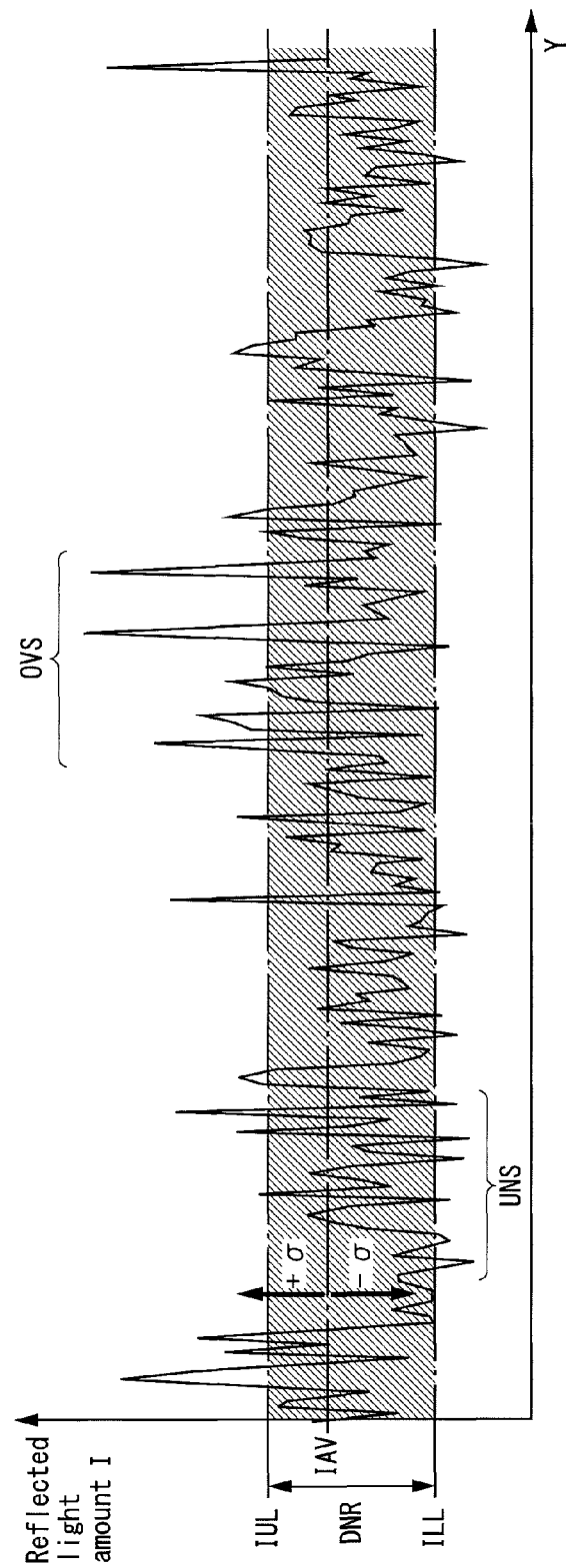
FIG. 8A is a graph showing a relationship between the distribution of reflected light amounts forming speckle pattern and the dynamic range of the image sensor element in FIGS. 5A and 5B.

FIG. 8A is a graph showing a relationship between distribution of reflected light amounts I forming speckle pattern and the dynamic range DNR of the image sensor element 421. This graph has the horizontal axis indicating locations in the direction of a long side of the pixel matrix of the image sensor element 421, and the vertical axis representing amounts of reflected light I received by each pixel aligned in a row in the direction of the long side. The hatched portion DNR of the graph represents the dynamic range of the image sensor element 421. When the sheet has especially high reflectivity, speckle causes the peak OVS of distribution of the reflected light amounts I to exceed the upper limit IUL of the dynamic range DNR of the image sensor element 421, or the trough UNS of the distribution to fall below the lower limit ILL of the dynamic range DNR.

Figure 8B:
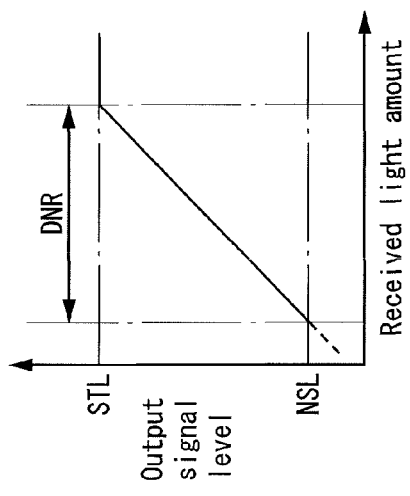
FIG. 8B is a graph showing a relationship between light amounts received by the image sensor element and levels of its output signal.

FIG. 8B is a graph showing a relationship between light amounts received by the image sensor element 421 and levels of its output signal. Referring to FIG. 8B, the dynamic range DNR of the image sensor element 421 indicates the range of light amounts that are received by the element 421 and distinguishable from the levels of the output signal of the element 421. Let us describe this more concretely. First, the upper limit IUL of the dynamic range DNR is determined by an upper limit of the charge amount that the element 421 can store in a single pixel. Even if the received light amount is the upper limit IUL or more, the element 421 cannot store in any pixel a charge amount of its upper limit or more, and thus, the level of the output signal is saturated at its maximum STL. Second, the lower limit ILL of the dynamic range DNR is determined by an upper limit of noise mixed with the output signal of the element 421. If the received light amount is the lower limit ILL or less, the output signal has a level equal to or below levels of the noise, thus being undistinguishable from the noise.

The peak OVS of the reflected light amounts I exceeding the upper limit IUL of the dynamic range DNR corresponds to a saturated level of the output signal, and the trough UNS of the reflected light amounts I below the lower limit ILL of the dynamic range DNR corresponds to a level of the output signal indistinguishable from the noise. Accordingly, the element 421 reassigns the peak OVS and tough UNS to levels of the output signal flattened at the upper limit IUL and the lower limit ILL, respectively. Use of these flattened levels of the output signal as they are would impair the correlation of speckle pattern between different images of a sheet to cause an error in the peak location of the correlation coefficients. Such an error might prevent a displacement of the sheet from being measured with a higher degree of accuracy.

In order to avoid the error, the distribution of reflected light amounts I should fall within the dynamic range DNR of the image sensor element 421. For the purpose of achieving such a distribution, the correction unit 434 corrects the laser light amount of the light source 411 in the following manner when the main controller unit 60 instructs the printer 130 to start processing of a print job, or when, caused by the processing, the displacement sensor 400 detects a sheet.

The correction unit 434 first measures a speckle contrast from the distribution of the reflected light amounts I indicated by each frame that the imaging unit 432 has generated. The "speckle contrast" SPC is defined as a ratio of a fluctuation of the reflected light amounts I, i.e. a standard deviation σ, to an average value IAV of them: SPC=σ/IAV. The average value IAV and standard deviation σ are provided with the following equations: IAV=<I>, σ=(<I$^2$>−IAV$^2$)$^{1/2}$. The operator <•> denotes averaging an operand for all the pixels of one frame. As is clear from the definition, a larger fluctuation of the reflected light amounts I entails a higher speckle contrast SPC.

The correction unit 434 next compares a measured value of the speckle contrast of each frame with a reference value, and based on the difference between the values, corrects the laser light amount of the light source 411. This reference value is set to a speckle contrast to be measured when the following conditions are satisfied: The maximum of amounts of light RLT reflected from the capture region CPR is equal to or lower than the upper limit IUL of the dynamic range DNR of the image sensor element 421, and in addition, the minimum of the reflected light amounts is equal to or higher than the lower limit ILL of the dynamic range DNR. More accurately, the reference value represents a speckle contrast to be measured when the probability that the maximum amount of the reflected light RLT exceeds the upper limit IUL of the dynamic range DNR is a predefined level or less, and in addition, the probability that the minimum amount of the reflected light falls below the lower limit ILL of the dynamic range DNR is another predefined level or more.

More concretely, the correction unit 434 uses an error between the measured value SPC of the speckle contrast and the reference value to correct the power PWR of the light source 411 by eq. (2):

$$PWR' = PWR \cdot \left(1 - \alpha \frac{SPC - REF}{REF}\right) \quad (2)$$

The constant α is a positive number, determined from the accuracy of adjustment of output of the light source 411, or the rate of the light source 411 responding to the adjustment, etc.

The correction of the laser light amount of the light source 411 can adjust a speckle contrast. Indeed, a typical semiconductor laser included in the light source 411 with a higher output power emits light with higher coherence. Irradiation with more highly coherent light causes more intense interference between reflected lights, thus entailing a higher speckle contrast.

FIGS. 9A, 9B, 9C, and 9D are graphs showing spectra of light emitted by the light source 411 when its output power is 5 mW, 3 mW, 1 mW, and 0.5 mW, respectively. Referring to FIGS. 9A-9D, a higher output power of the semiconductor laser included in the light source 411 entails a higher degree of monochromaticity of oscillation modes. This indicates that the higher output power produces more highly coherent laser light.

Figure 9A:
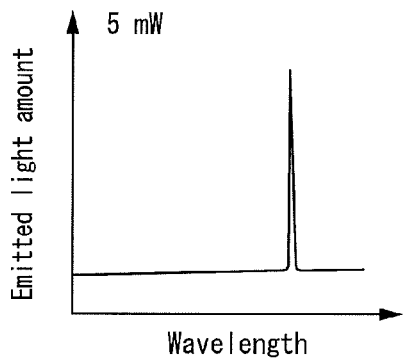
FIGS. 9A, 9B, 9C, and 9D are graphs showing spectra of light emitted by the light source in FIGS. 5A and 5B when its output power is 5 mW, 3 mW, 1 mW, and 0.5 mW, respectively.
Figure 9E:
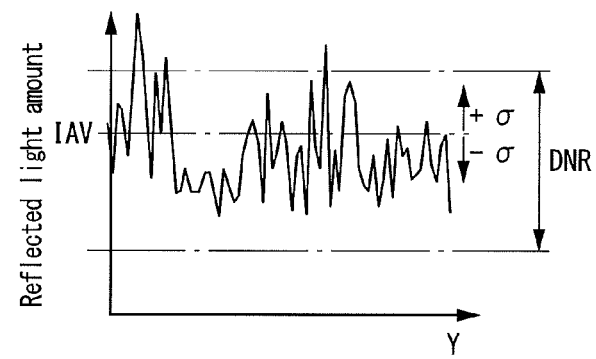
FIGS. 9E, 9F, 9G, and 9H are graphs showing a relationship between reflected light amounts and the dynamic range of the image sensor element in FIGS. 5A and 5B when laser light of the light source has the spectra shown in FIGS. 9A-9D.
Figure 9B:
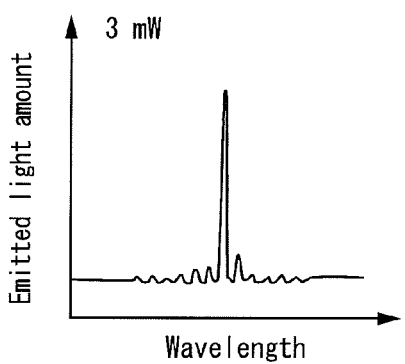
Figure 9F:
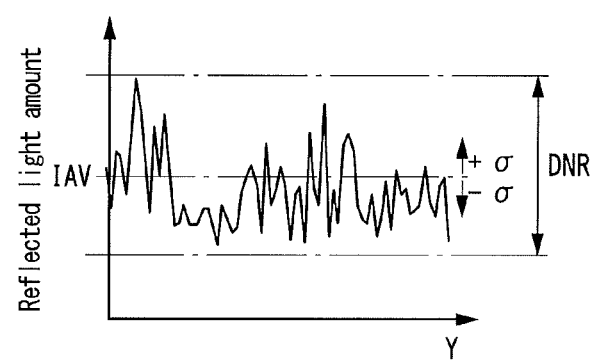
Figure 9C:
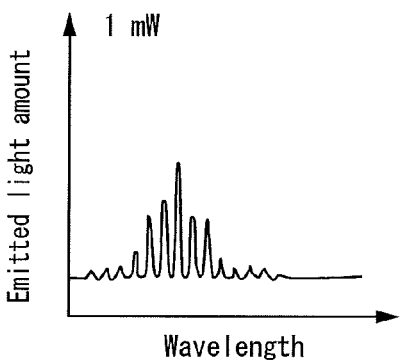
Figure 9G:
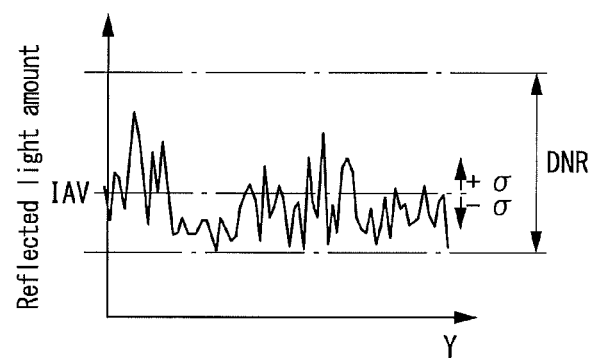
Figure 9D:
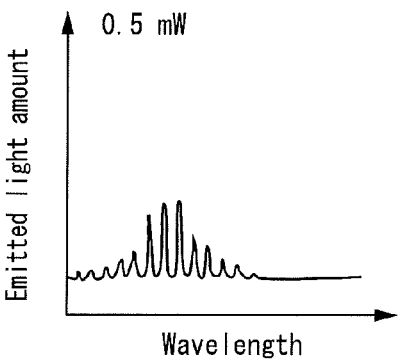
Figure 9H:
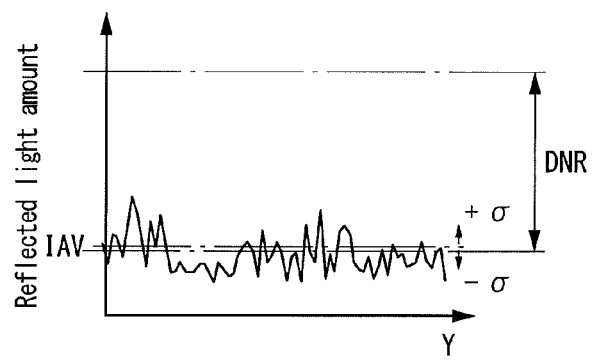

FIGS. 9E, 9F, 9G, and 9H are graphs showing a relationship between reflected light amounts and the dynamic range DNR of the image sensor element 421 when the laser light of the light source 411 has the spectra shown in FIGS. 9A-9D. Like the graph shown in FIG. 8A, the graphs shown in FIGS. 9E-9H have the horizontal axis indicating locations in the direction of a long side of the pixel matrix of the image sensor element 421 (the Y-axis direction), and the vertical axis representing amounts of reflected light I received by each pixel aligned in a row in the direction of the long side. Referring to FIGS. 9E-9H, a higher output power of the light source 411 entails not only a higher average value IAV of the reflected light amounts I but also a larger standard deviation σ. Especially as FIG. 9E shows, the 5-mW power output of the light source 411 causes the difference between the average value IAV and the upper limit IUL of the dynamic range DNR to be close to the standard deviation σ, and thus, there is a sufficiently high probability that the peak of the reflected light amounts I exceeds the upper limit IUL. On the other hand, as FIG. 9H shows, the 0.5-mW power output of the light source 411 causes the difference between the average value IAV and the lower limit ILL of the dynamic range DNR to be close to the standard deviation σ, and thus, there is a sufficiently high probability that the peak of the reflected light amounts I falls below the lower limit ILL. As FIGS. 9F and 9G show, the 3-mW and 1-mW power outputs of the light source 411 result in a lower probability that the reflected light amounts I fall outside the dynamic range DNR than the 5-mW and 0.5-mW power outputs do.

Accordingly, the reference value is set to the speckle contrast to be measured when the output power of the light source 411 is 3 mW or 1 mW.

The reference value is determined by experiment or simulation and then stored in the ROM 63 of the main controller unit 60 shown in FIG. 4, for example, at the time of manufacture of the displacement sensor 400. Since the reference value typically varies with paper types, various reference values are written in the ROM 63 in the form of a correspondence table with paper types. At the start of processing a job, the CPU 61 of the main controller unit 60 retrieves from the correspondence table in the ROM 63, a reference value corresponding to a paper type required by the job, and stores it in the RAM 62. This reference value is used by the correction unit 434 for correction of the laser light amount.

Procedure of Displacement Detection

Figure 10:
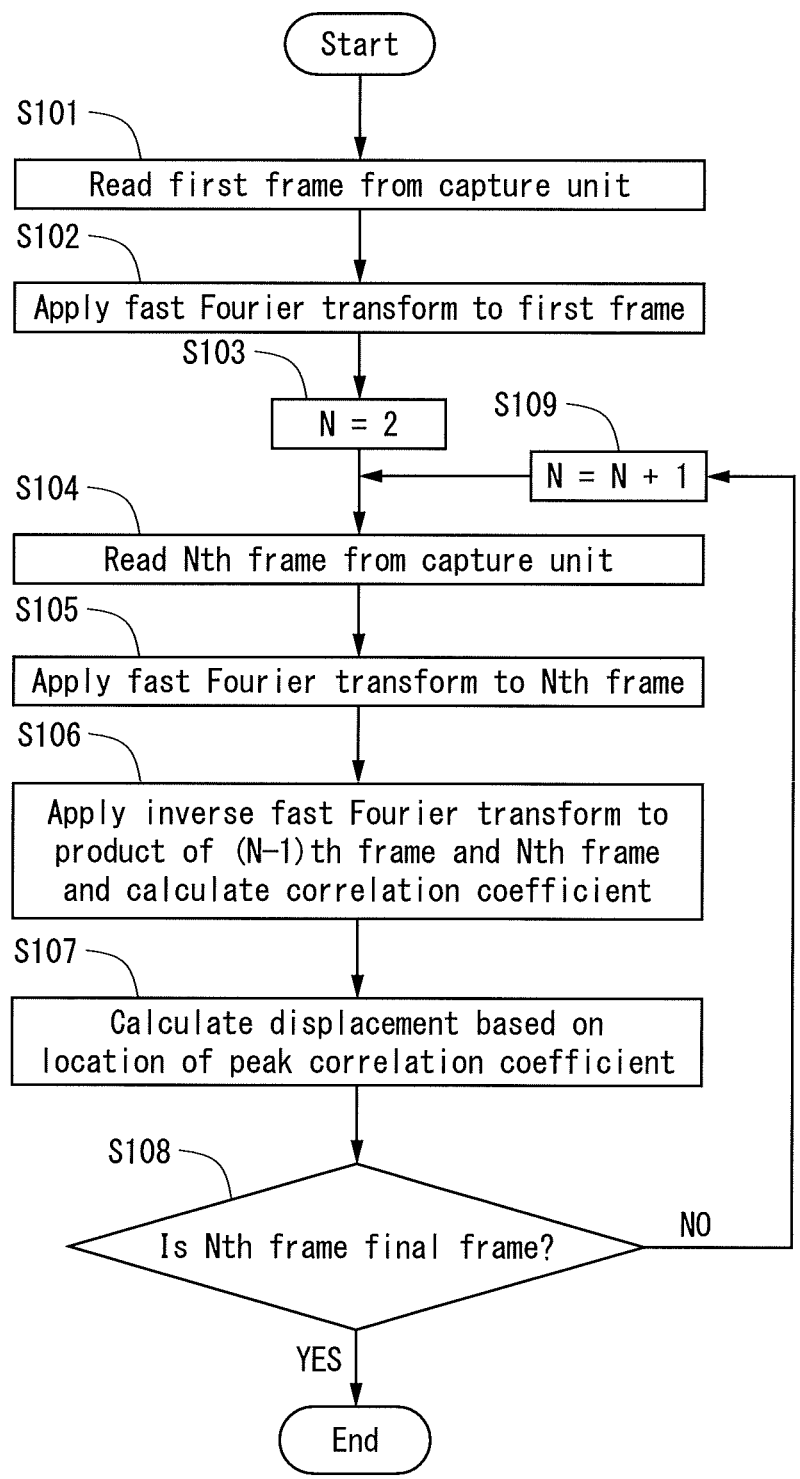
FIG. 10 is a flowchart of detection of a displacement from a series of frames generated by the capture unit in FIG. 5B.

FIG. 10 is a flowchart of the detection of a displacement from a series of frames generated by the capture unit 432. This process starts when the control unit 430 is instructed by the driver unit 10D of the feeder section 10 or the driver unit 20D of the imaging section 20 to monitor a sheet being conveyed.

In step S101, the displacement calculation unit 433 reads the first frame from the capture unit 432 to the frame memory 501. Then, the process proceeds to step S102.

In step S102, the displacement calculation unit 433 uses the FFT unit 502 to apply FFT to the first frame. Then, the process proceeds to step S103.

In step S103, the displacement calculation unit 433 initializes an integer variable N to two: N=2. Then, the process proceeds to step S104.

In step S104, the displacement calculation unit 433 reads the frame whose frame number is equal to the variable N, hereinafter referred to as the "N-th frame," from the capture unit 432 to the frame memory 501. Then, the process proceeds to step S105.

In step S105, the displacement calculation unit 433 uses the FFT unit 502 to apply FFT to the N-th frame. Then, the process proceeds to step S106.

In step S106, the (N−1)-th and N-th frames after Fourier transform are stored in the frame memory 501. The displacement calculation unit 433 uses the IFFT unit 503 to obtain the product of these two frames and apply IFFT to the product. Thus, the unit 433 calculates correlation coefficients between the two frames. Then, the process proceeds to step S107.

In step S107, the displacement calculation unit 433 uses the output unit 504 to search for the location where the correlation coefficients calculated in step S106 have a peak, and from the location, determine a displacement of a sheet. The unit 433 transfers the displacement as a sample to the driver unit 10D of the feeder section 10 or the driver unit 20D of the imaging section 20. Then, the process proceeds to step S108.

In step S108, the displacement calculation unit 433 confirms with the capture unit 432 whether or not the N-th frame is the final frame. If so, the process ends, and if not, the process proceeds to step S109.

In step S109, the capture unit 432 still has one or more frames whose frame number is larger than the N-th frame's. Accordingly, the displacement calculation unit 433 increments the variable N by one: N=N+1. Then, the process repeats the steps from step S104.

Procedure of Correction of Laser Light Amount

Figure 11:
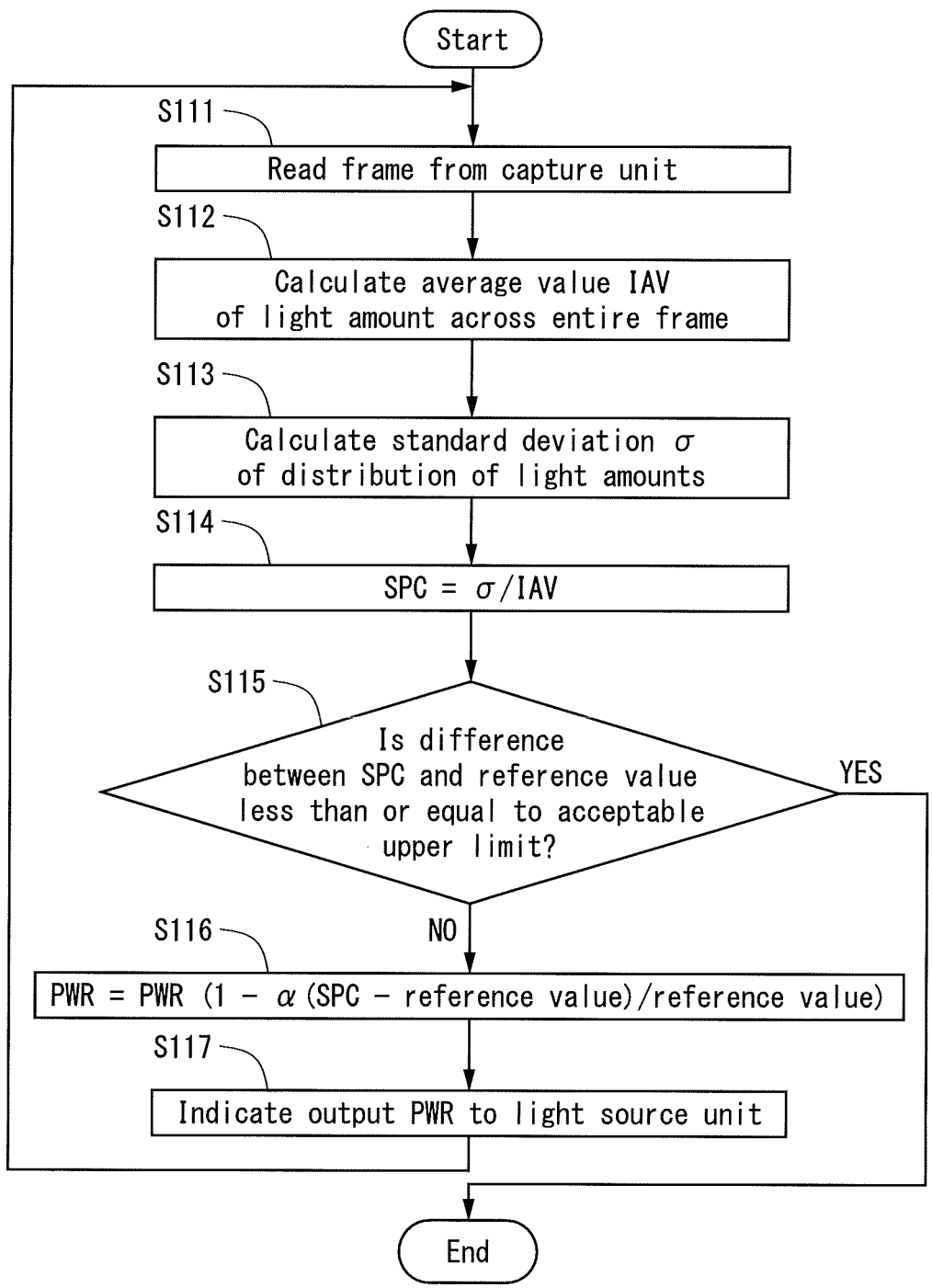
FIG. 11 is a flowchart of correction of laser light amount of the light source in FIGS. 5A and 5B based on each frame generated by the capture unit in FIG. 5B.

FIG. 11 is a flowchart of the correction of laser light amount of the light source 411 based on each frame generated by the capture unit 432. This process starts when the correction unit 434 detects the start command for processing a print job that is transferred from the main controller section 60 to the elements of the printer 130, or during the processing, when the displacement sensor 400 detects a sheet.

In step S111, the correction unit 434 reads a frame from the capture unit 432. Then, the process proceeds to step S112.

In step S112, the correction unit 434 reads brightness of pixels from the frame and converts them to received light amounts to calculate an average value IAV of the received light amounts among all the pixels in the frame. Then, the process proceeds to step S113.

In step S113, the correction unit 434 calculates the standard deviation σ of the distribution of received light amounts from the light amounts I received by the pixels and their average value IAV, which the correction unit 434 has calculated in step S112. Then, the process proceeds to step S114.

In step S114, the correction unit 434 calculates the ratio of the standard deviation σ calculated in step S113 to the average value IAV calculated in step S112 as a measurement value SPC of speckle contrast: SPC=σ/IAV. Then, the process proceeds to step S115.

In step S115, the correction unit 434 checks whether or not the difference between the measurement value SPC of speckle contrast calculated in step S114 and the reference value exceeds an acceptable upper limit. If so, the process proceeds to step S116, and if not, the process ends.

In step S116, the difference between the measurement value SPC of speckle contrast and the reference value exceeds the acceptable upper limit, and accordingly, the correction unit 434 uses the difference to correct the power PWR of the light source 411 by eq. (2). Then, the process proceeds to step S117.

In step S117, the correction unit 434 indicates the corrected power PWR to the light source unit 431, and thus the light source unit 431 supplies a current amount corresponding to the power PWR to the light source 411, which accordingly changes its laser light amount. Then, the process repeats the steps from step S111.

Merit of Embodiment

The MFP 100 according to the embodiment of the invention uses the displacement sensor 400 as the feeder sensor 1FS, 2FS, or the timing sensor TS. As described above, the displacement sensor 400 captures a series of images of a surface of a traveling sheet, and from the shift of a peak of the coefficient of correlation between the distributions of reflected light amounts indicated by two of the images, calculates a displacement of the sheet. The displacement sensor 400 further measures a speckle contrast from each image, and based on the difference between the measured value SPC and the reference value, corrects the laser light amount of the light source 411. The reference value is set to the value of a speckle contrast to be measured when the maximum amount of reflected light does not exceed the upper limit IUL of the dynamic range DNR of the image sensor element 421, and in addition, when the minimum amount of reflected light does not fall below the lower limit ILL of the dynamic range DNR. Using the corrected amount of laser light of the light source 411, the displacement sensor 400 makes the measured value SPC of a speckle contrast agree with the reference value. This ensures that the distribution of reflected light amounts falls within the dynamic range DNR of the image sensor element 421. The displacement sensor 400 can thus determine a displacement of a sheet of any paper types that are different in light reflectivity with a high degree of accuracy. As a result, the MFP 100 can calculate the location or velocity of a sheet sent out from the feeder roller 12F or the timing roller 27 with high precision and in real time, and therefore, enables drive control of the rollers 12F and 27 to achieve a higher degree of accuracy.

Modification (A) The image processing device 100 that FIG. 1A shows is the MFP. Alternatively, an image processing device according to an embodiment of the invention may be any single-function device, e.g. a laser printer, a printer of another type such as an inkjet type, a copier, a scanner, a fax machine.

(B) The MFP 100 uses the displacement sensor 400 as the feeder sensor 1FS, 2FS, or the timing sensor TS. The displacement sensor 400 may be used in control for conveyance of sheets as another paper sensor CS or ES. A target for determination of a displacement, not being limited to a sheet, may be a rotatable image carrier such as the photoreceptor drum 25Y, . . . , 25K, or the intermediate transfer belt 23. A displacement of the target may be used in control for rotation of the image carrier or image stabilization. The displacement sensor 400 further may be used not only in an image forming device such as the MFP 100, but also in a generic device equipped with mechanism of conveyance of sheets such as an ADF, scanner, or finisher, for determination of a displacement of a movable member such as a sheet or conveyance roller.

(C) The displacement calculation unit 433 uses eq. (1) to calculate coefficients of correlation between brightness distributions in two images, then determining a displacement of a sheet from a deviation of peaks of the distributions. Alternatively, the displacement calculation unit 433 may use other image recognition technologies such as the combination of edge detection, histogram of oriented gradients (HOG), and support vector machine (SVM), to retrieve portions CHP of two images sharing a common feature of speckle pattern (cf. FIG. 7B), then calculating a displacement of a sheet from a shift amount $\epsilon$ of the portions CHP within the images.

(D) The correction unit 434 makes the measured value of a speckle contrast in agreement with the reference value a requirement for correction of the laser light amount. The correction unit 434 may add to the requirement the statistic representative value, e.g. the average value IAV, the median value, or the mode value, of the amounts I of light reflected from the capture region CPR coincident with a target value TGT. For example, the correction unit 434 monitors the difference between the average value IAV of the reflected light amounts I and a target value, and if the difference exceeds an acceptable upper limit, uses the difference to correct the power PWR of the light source 411 with the following equation (3):

$$PWR = PWR \cdot \left(1 - \beta \frac{IAV - TGT}{TGT}\right) \quad (3)$$

The constant $\beta$ is a positive number, determined from the accuracy of adjustment of output of the light source 411, or the rate of the light source 411 responding to the adjustment, etc.

As FIGS. 9E, . . . , 9H show, when the speckle pattern indicates the reflected light amounts I fluctuating symmetrically with respect to the average value IAV, the correction unit 434 sets the target value for the average value IAV to a value located at the center or its vicinity of the dynamic range DNR. In this case, mere appearance of the average value IAV more closely to the center of the dynamic range DNR reduces the probability that the peak or trough of the reflected light amounts I falls outside the dynamic range DNR.

Measure Against Image Blur

An alternative target value for the average value IAV may be determined to prevent image blurs of speckle pattern from reducing the accuracy of measuring the displacement of a sheet. The "image blurs" mean motion blurs in the image of a moving sheet, i.e. blurs that motion of the sheet causes in its image. The reduction of measurement accuracy caused by the image blurs can be avoided by an adjustment of laser light amounts from the light source 411 as follows.

Figure 12A:
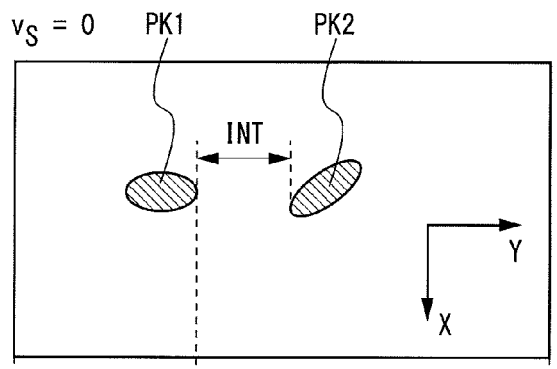
FIGS. 12A, 12B, and 12C are schematic diagrams of speckle pattern appearing in images of a sheet traveling at conveyance speeds of 0 mm/sec, 100 min/sec, and 300 min/sec, respectively.
Figure 12B:
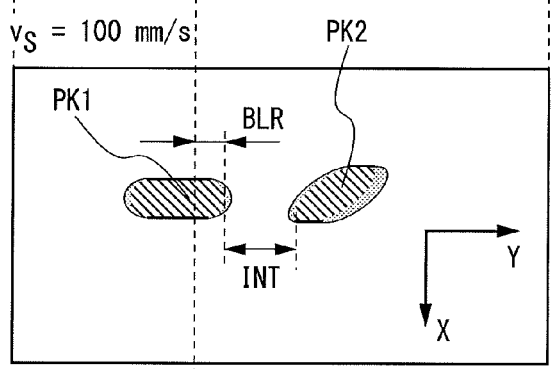
Figure 12C:
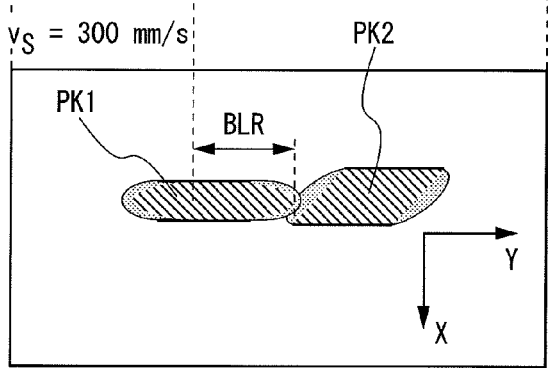
Figure 12D:
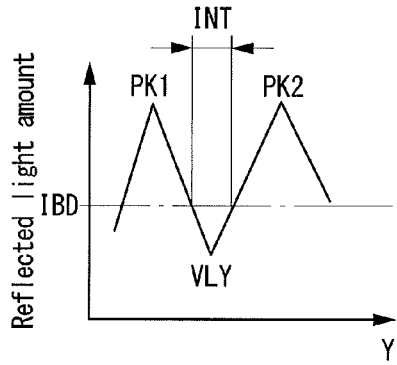
FIGS. 12D, 12E, and 12F are graphs showing intensity distribution of reflected light forming the speckle pattern shown in FIGS. 12A, 12B, and 12C, respectively.
Figure 12E:
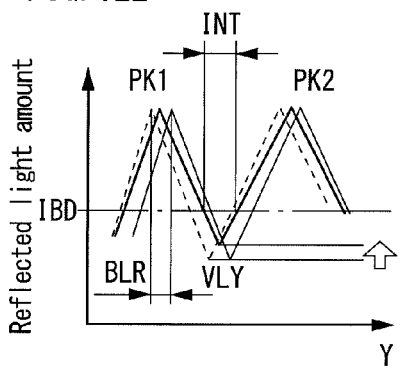
Figure 12F:
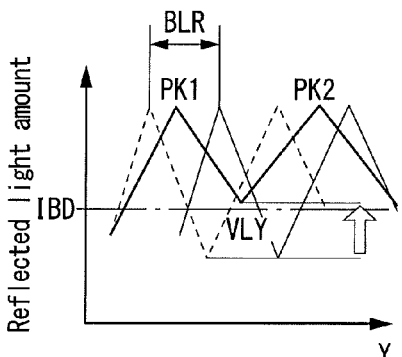

FIGS. 12A, 12B, and 12C are schematic diagrams of speckle pattern appearing in images FRM of a sheet traveling at conveyance speeds vs of 0 mm/sec, 100 mm/sec, and 300 min/sec, respectively. FIGS. 12D, 12E, and 12F are graphs showing intensity distribution of reflected light forming the speckle pattern shown in FIGS. 12A, 12B, and 12C, respectively. Hatched areas PK1 and PK2 shown in FIGS. 12A, 12B, and 12C represent regions of the speckle pattern appearing in images FRM of the sheet where reflected light amounts are equal to or larger than a boundary value IBD shown in FIGS. 12D, 12E, and 12F. The regions are hereinafter referred to as "peak regions." This boundary value IBD is determined, for example, such that a ratio of the value IBD to a peak value of the reflected light amounts is equal to a predefined value.

Referring to FIGS. 12A, 12B, and 12C, a sheet traveling in the conveyance direction, i.e. the Y-axis direction, during an exposure time of the image sensor element 421 causes an image blur in the direction to appear in the speckle pattern, thus extending each peak region PK1, PK2 in the direction. The length of extension of the peak region PK1, i.e. the distance BLR from the top end in the Y-axis direction of the peak region PK1 during rest of the sheet shown in FIG. 12A to the top end during conveyance of the sheet shown in FIGS. 12B and 12C, is referred to as a "blur amount." The blur amount BLR is proportional to the conveyance speed vs of the sheet, and thus a higher conveyance speed vs results a larger blur amount BLR. Since the rear end in the Y-axis direction of the peak region PK2 shifts by an amount smaller than the blur amount BLR, a higher conveyance speed vs of the sheet entails a narrower interval INT in the Y-axis direction between the peak regions PK1 and PK2 as shown in FIGS. 12A, 12B, and 12C. Especially when the speed vs is a specified value or higher, the interval between the peak regions disappears, as shown in FIG. 12C.

Referring to FIGS. 12E and 12F, the broken-line graph indicates the distribution of reflected light amounts during rest of the sheet, the thin-solid-line graph indicates the distribution translated in the Y-axis direction by the blur amount BLR, and the bold-solid-line graph indicates the actual distribution of reflected light amounts. As seen from these graphs, increase in the blur amounts BLR raises the trough VLY between the peak regions PK1 and PK2. As a result, a higher conveyance speed vs of the sheet causes a narrower interval INT in the Y-axis direction between the peak regions PK1 and PK2. Especially when the speed vs is a specified value or higher, the trough VLY exceeds the boundary value IBD of the peak regions PK1 and PK2, and thus the interval between the peak regions disappears.

As discussed above, the narrowing interval between the peak regions PK1 and PK2 that follows the increasing conveyance speed vs of the sheet results from the rising trough VLY. Accordingly, the higher speed vs more greatly reduces variation in the distribution of light amounts received by the image sensor element 421 from the actual distribution of reflected light amounts caused by the speckle pattern. Since reducing variation in distribution means more highly flattening the distribution, the speckle pattern has reduced correlation between the different images. Thus, the higher conveyance speed vs of the sheet increases the measurement error in the correlation coefficients between the different images, then deteriorating the measurement accuracy in the displacement of the sheet.

In order to prevent the deterioration, the correction unit 434, for example, sets a target value for the average value IAV of the distribution of reflected light amounts as follows. The correction unit 434 first acquires the target value of the sheet conveyance speed vs from the main controller unit 60, the driver unit 10D of the feeder section 10, or the driver unit 20D of the imaging section 20, then from the target value, estimates the blur amount BLR. The correction unit 434 next establishes an acceptable range for the average value IAV of reflected light amounts such that the peak regions PK1 and PK2 to be detected during rest of the sheet have an interval larger than the estimated value of the blur amount BLR. From the range, the correction unit 434 selects a target value for the average value IAV.

Figure 12G:
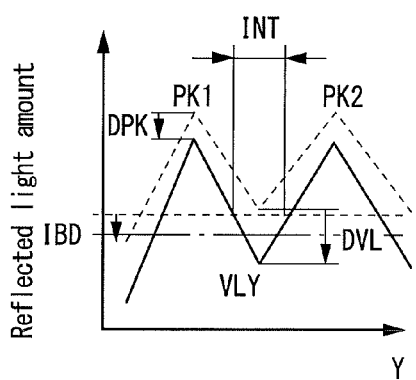
FIG. 12G is a graph showing a distribution of reflected light amounts when the sheet conveyance speed is 300 mm/sec and the laser light amount of the light source in FIGS. 5A and 5B is reduced from the value in FIG. 12F.

FIG. 12G is a graph showing distribution of reflected light amounts when the sheet conveyance speed is 300 mm/sec and the laser light amount of the light source 411 is reduced from the value in FIG. 12F. Referring to FIG. 12G, the broken-line graph indicates the distribution before reduction in the laser light amount, and the solid-line graph indicates the distribution after the reduction. As shown in these graphs, reduction of the laser light amount causes fall of the reflected light amount throughout the distribution. In particular, the amount of fall DVL in the trough VLY is larger than the amount of fall DPK in each peak region PK1, PK2, since the actual light amount received by the image sensor element 421 is the sum of light amounts reflected from both portions of the sheet surface corresponding to the peak regions PK1 and PK2. If the fall causes the trough VLY to relocate below the boundary value IBD of the peak regions PK1 and PK2, an interval INT between the peak regions PK1 and PK2 is reproduced in the trough VLY. In other words, if the different light amounts of fall between the peaks and trough sufficiently increase variation in the distribution, correlation of speckle pattern reappears between the different images.

Figure 12H:
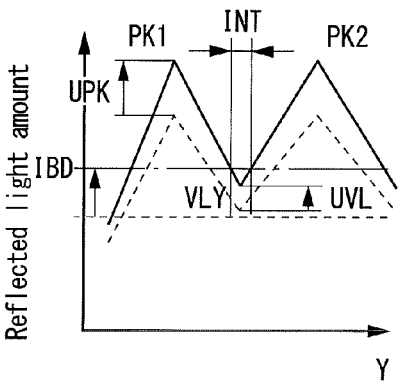
FIG. 12H is a graph showing a distribution of reflected light amounts when the sheet conveyance speed is 300 mm/sec and the laser light amount of the light source is increased from the value in FIG. 12F.

FIG. 12H is a graph showing distribution of reflected light amounts when the sheet conveyance speed is 300 mm/sec and the laser light amount of the light source 411 is increased from the value in FIG. 12F. Referring to FIG. 12H, the broken-line graph indicates the distribution before increase in the laser light amount, and the solid-line graph indicates the distribution after the increase. As shown in these graphs, increase in the laser light amount causes rise of the reflected light amount throughout the distribution. In particular, since speckle becomes stronger, the amount of rise UPK in each peak region PK1, PK2 is larger than the amount of rise UVL in the trough VLY. If the rise causes the boundary value IBD of the peak regions PK1 and PK2 to relocate above the trough VLY, an interval INT between the peak regions PK1 and PK2 is reproduced in the trough VLY. In other words, if the different light amounts of rise between the peaks and trough sufficiently increase variation in the distribution, correlation of speckle pattern reappears between the different images.

The correction unit 434 compares the above-described effect obtained by the reduction of laser light amount shown in FIG. 12G with the above-described effect obtained by the increase of laser light amount shown in FIG. 12H. Based on the comparison, the correction unit 434 determines the acceptable range or target value for the average value IAV in the distribution of reflected light amounts such that the measurement error in the correlation coefficients between the different images is reduced to be an acceptable upper limit or lower in a shorter time.

Preferably by an experiment or simulation at manufacture of the MFP 100, the acceptable range or target value for the average value IAV of reflected light amounts should be selected for each target value of the sheet conveyance speed vs, and a correspondence table for these values should be stored in the ROM 63. Since the target values of the sheet conveyance speed vs are selected depending on paper types or thicknesses, the correspondence table may link, instead of the target values of the speed vs, the paper types or thicknesses to the acceptable ranges or target values for the average value IAV of reflected light amounts. From the correspondence table, the correction unit 434 retrieves an acceptable range or target value for the average value IAV of reflected light amounts linked to the target value of the sheet conveyance speed vs or the paper type to be processed in a job.

Procedure of Laser Light Amount Correction Process

Process of correction in laser light amount, when requiring not only a measurement value of the speckle contrast that is coincident with the reference value, but also the average value IAV of amounts of light reflected from the capture region CPR, has the following two options that are modifications of the method shown in FIG. 11.

Figure 13:
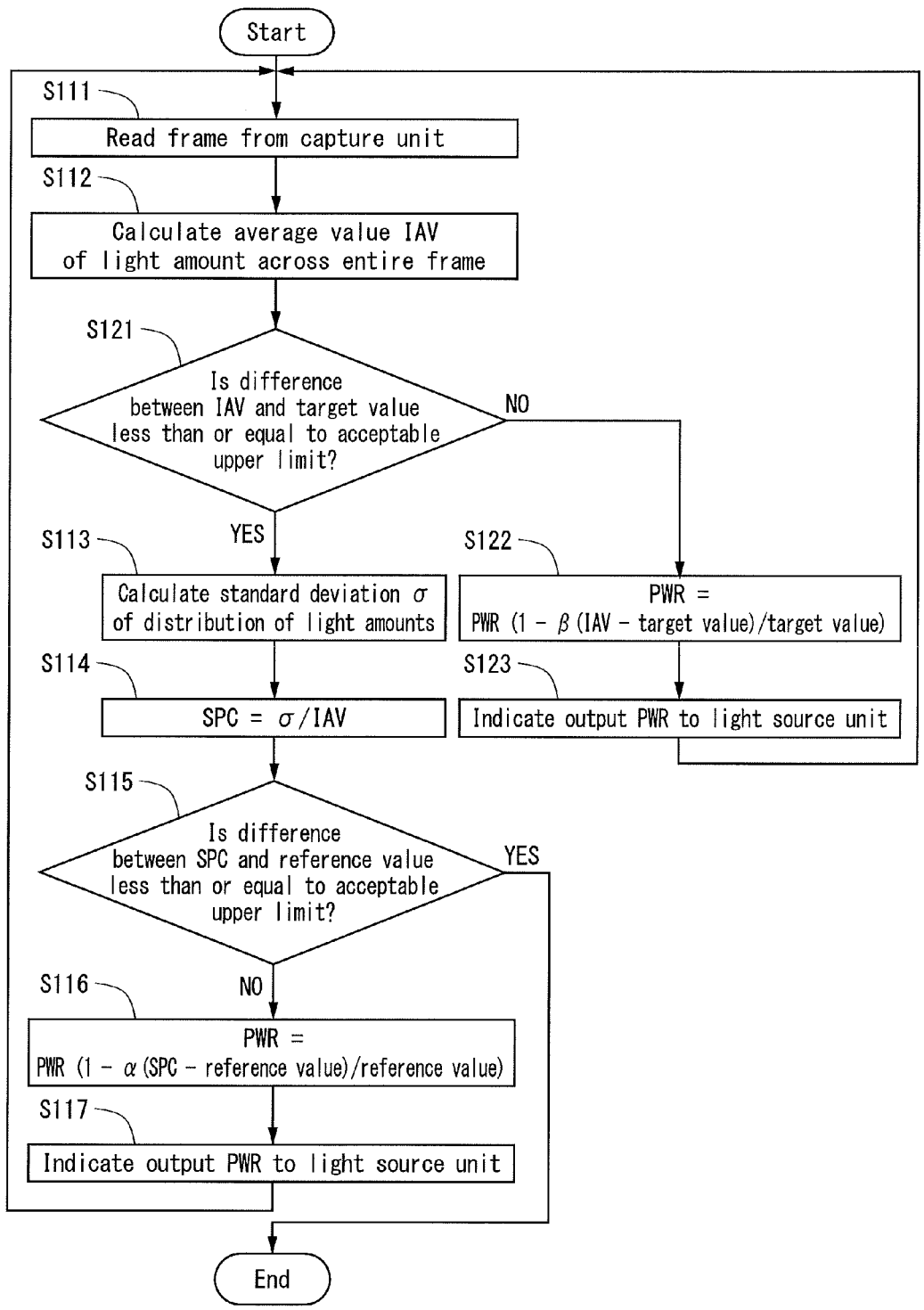
FIG. 13 is a flowchart of the first modification for the correction of laser light amounts shown in FIG. 11.

FIG. 13 is a flowchart of the first modification. This process differs from that shown in FIG. 11 only in steps S121, S122, and S123 added between the steps S112 and S113.

In step S111, the correction unit 434 reads a frame from the capture unit 432. Then, the process proceeds to step S112.

In step S112, the correction unit 434 calculates from the frame an average value IAV of received light amounts among all pixels. Then, the process proceeds to step S121.

In step S121, the correction unit 434 checks whether or not the difference between the average value IAV of received light amounts calculated in step S112 and a target value exceeds an acceptable upper limit. If so, the process proceeds to step S122, and if not, the process proceeds to step S113.

In step S113, the difference between the average value IAV of received light amounts and the target value exceeds the acceptable upper limit, and thus the correction unit 434 calculates the standard deviation σ of the distribution of received light amounts. Then, the process proceeds to step S114.

In step S114, the correction unit 434 calculates a measurement value SPC of speckle contrast. Then, the process proceeds to step S115.

In step S115, the correction unit 434 checks whether or not the difference between the measurement value SPC of speckle contrast and the reference value exceeds an acceptable upper limit. If so, the process proceeds to step S116, and if not, the process ends.

In step S116, the difference between the measurement value SPC of speckle contrast and the reference value exceeds the acceptable upper limit, and accordingly, the correction unit 434 uses the difference to correct the power PWR of the light source 411 by eq. (2). Then, the process proceeds to step S117.

In step S117, the correction unit 434 indicates the corrected power PWR to the light source unit 431, and thus the light source unit 431 supplies a current amount corresponding to the power PWR to the light source 411, which accordingly changes its laser light amount. Then, the process repeats the steps from step S111.

In step S122, the difference between the average value IAV and the target value exceeds the acceptable upper limit, and accordingly, the correction unit 434 uses the difference to correct the power PWR of the light source 411 by eq. (3). Then, the process proceeds to step S123.

In step S123, the correction unit 434 indicates the corrected power PWR to the light source unit 431, and thus the light source unit 431 supplies a current amount corresponding to the power PWR to the light source 411, which accordingly changes its laser light amount. Then, the process repeats the steps from step S111.

In the first modification, the correction unit 434 matches the average value IAV of light amounts received by the image sensor element 421 to its target value within an acceptable range, before matching the measurement value SPC of the speckle contrast to the reference value. Since the measurement of the average value IAV of the received light amounts needs a smaller calculation amount than the measurement of the speckle contrast, the correction unit 434 can reduce the time length of the correction process.

Figure 14:
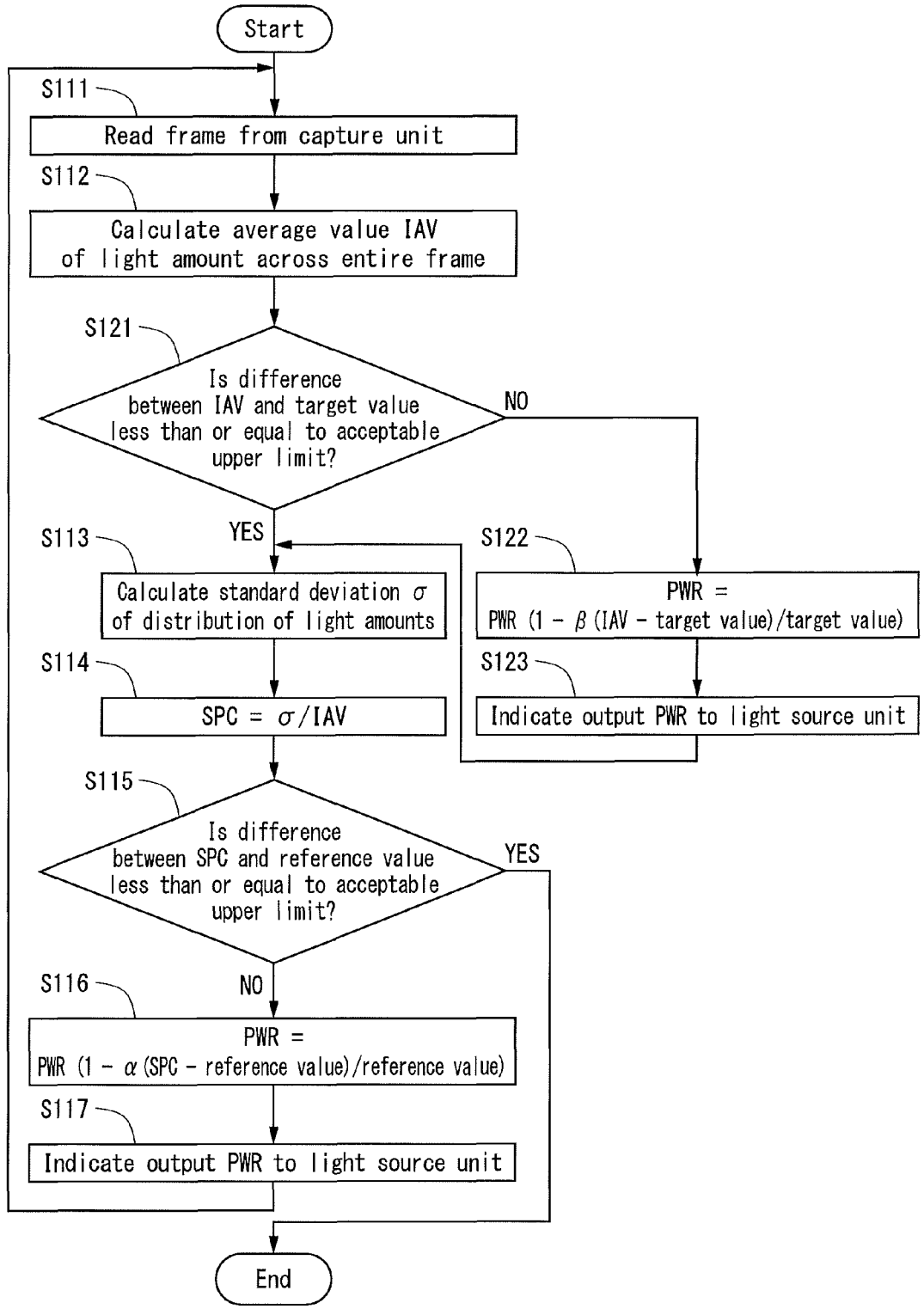
FIG. 14 is a flowchart of the second modification for the correction of laser light amounts shown in FIG. 11.

FIG. 14 is a flowchart of the second modification. This process differs from that shown in FIG. 11 only in the steps S121, S122, and S123 added between the steps S112 and S113, and differs from that shown in FIG. 13 in that the step S113 is executed after the step S123. Each step is common among those processes, and thus, details of the step can be found in the description about FIG. 11, 12, or 13.

In the second modification, every time the correction unit 434 corrects the laser light amount such that the average value IAV of light amounts received by the image sensor element 421 approaches its target value, the correction unit 434 further corrects the laser light amount such that the measurement value SPC of the speckle contrast approaches the reference value. This further correction, compared to the first modification, can reduce the risk that the average value IAV of received light amounts might significantly deviate from the target value again.

(E) The detection unit 420 defines the capture region CPR within the range RRG that the light source 411 irradiates with laser light as shown in FIGS. 7A-7C, and maintains a constant size of the region CPR such that light reflected from the region enters the entirety of the pixel matrix. Alternatively, the correction unit 434 may make the detection unit 420 vary the size of the region CPR depending on the gradient of light amounts reflected from the region CPR. This is for the following reason.

A general distribution of the reflected light amounts includes gradients GRD such as those in FIG. 6C, i.e. gradations of brightness among pixels. If the size of the capture region CPR in the Y-axis direction were excessively shorter than a typical span of these gradients GRD, i.e. a typical distance between a peak SPR and a trough CNC of the reflected light amounts, an insufficient number of peaks SPR and troughs CNC could appear in the pixel matrix, thus entailing an insufficient accuracy of the measurement of speckle contrast. If the size of the capture region CPR were excessively longer, too many peaks SPR and troughs CNC could appear in the pixel matrix, thus requiring an excessively large amount of calculation for the measurement of speckle contrast.

In order to prevent these problems, the correction unit 434 instructs the detection unit 420 to change the size of the capture region CPR as follows. The detection unit 420 sets the initial value of the size of the region CPR to the minimum within an acceptable range. The correction unit 434 first searches the gradients GRD appearing within a frame produced by the capture unit 432 for one with a size, i.e. the rate of change in reflected light amount between a peak SPR and a trough CNC no lower than a threshold level, which has been determined to be a lower limit of the size of a gradient GRD that is caused by speckle and distinguishable from others caused by noise. When finding gradients GRD fewer in number than an acceptable minimum, the correction unit 434 instructs the detection unit 420 to increase the size of the capture region CPR. The acceptable minimum has been determined to be the number of gradients required to maintain the accuracy of the measurement of speckle contrast at its acceptable lower level. After that, until finding gradients GRD more than the acceptable minimum, the correction unit 434 repeats the search for gradients GRD within the frame and the detection unit 420 iterates the increase in size of the capture region CPR. As a result, the correction unit 434 can optimize the number of pixels to be used in the measurement of speckle contrast for the efficiency of calculation required for the measurement.

Figure 15:
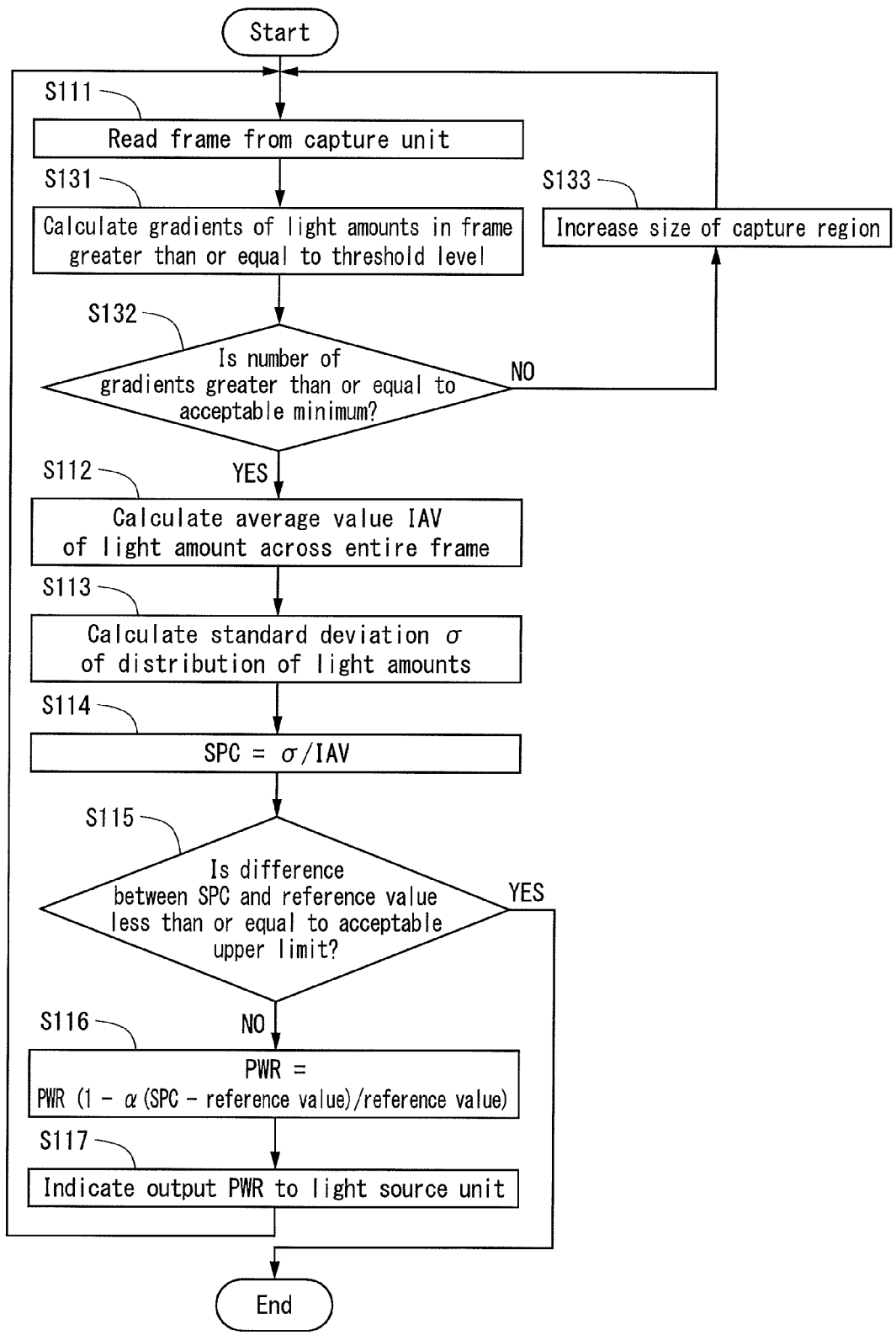
FIG. 15 is a flowchart of the third modification for the correction of laser light amounts shown in FIG. 11.

FIG. 15 is a flowchart of the third modification for the correction of laser light amounts shown in FIG. 11. This process differs from that shown in FIG. 11 only in steps S131, S132, and S133 added between the steps S112 and S113.

In step S111, the correction unit 434 reads a frame from the capture unit 432. Then, the process proceeds to step S131.

In step S131, the correction unit 434 searches the frame read in step S111 for a gradient GRD of reflected light amounts that has a size no lower than a threshold level. Then, the process proceeds to step S132.

In step S132, the correction unit 434 checks whether or not the gradients GRD found in step S131 are fewer in number than an acceptable minimum. If so, the process proceeds to step S133, and if not, the process proceeds to step S112.

In step S133, the gradients GRD found in step S131 are fewer in number than the acceptable minimum, and accordingly, the correction unit 434 instructs the detection unit 420 to increase the size of the capture region CPR. Then, the process repeats the steps from step S111.

In step S112, the number of the gradients GRD found in step S131 has reached the acceptable minimum or more, and accordingly, the correction unit 434 calculates from the frame read in step S111 an average value IAV of received light amounts among all pixels. Then, the process proceeds to step S113.

In step S113, the correction unit 434 calculates the standard deviation σ of the distribution of received light amounts. Then, the process proceeds to step S114.

In step S114, the correction unit 434 calculates a measurement value SPC of speckle contrast. Then, the process proceeds to step S115.

In step S115, the correction unit 434 checks whether or not the difference between the measurement value SPC of speckle contrast and the reference value exceeds an acceptable upper limit. If so, the process proceeds to step S116, and if not, the process ends.

In step S116, the difference between the measurement value SPC of speckle contrast and the reference value exceeds the acceptable upper limit, and accordingly, the correction unit 434 uses the difference to correct the power PWR of the light source 411 by eq. (2). Then, the process proceeds to step S117.

In step S117, the correction unit 434 indicates the corrected power PWR to the light source unit 431, and thus the light source unit 431 supplies a current amount corresponding to the power PWR to the light source 411, which accordingly changes its laser light amount. Then, the process repeats the steps from step S111.

In the third modification, the correction unit 434 makes the detection unit 420 vary the size of the capture region CPR depending on the levels of gradients GRD of reflected light amounts shown in a frame. This entails an optimum number of pixels for the efficiency of calculation required for the measurement of speckle contrast to be used in the measurement, thus reducing the burden of the control unit 430 for the correction of laser light amounts and the length of time of the correction.

(F) The correction unit 434 corrects laser light amount of the light source 411 at the same time as the printer 130 starts processing a print job, or as in the processing, the displacement sensor 400 detects a sheet. More specific timing of the correction varies depending on usage of the displacement sensor 400 as described below.

Use as Feeder Sensor

Figure 16A:
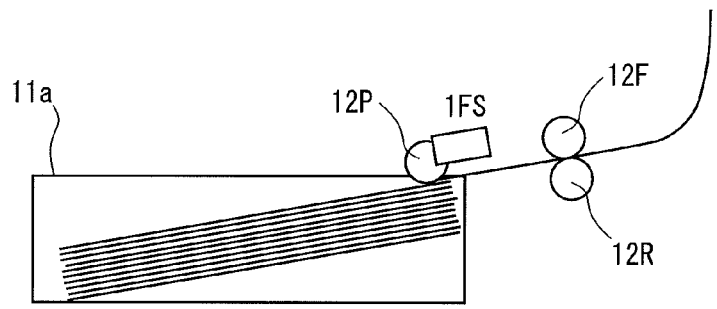
FIG. 16A is a schematic, partial cross-sectional view of the printer showing the feeder sensor in FIG. 3 and its vicinity.

FIG. 16A is a schematic, partial cross-sectional view of the printer 130 showing the feeder sensor 1FS and its vicinity. Referring to FIG. 16A, the feeder sensor 1FS is placed above an edge of the paper cassette 11a, near the pickup roller 12P, which periodically rotates in the condition of contact with the top face of a stack of sheets SHT stored in the cassette 11a, thus sending the sheets SHT one by one from the top to the nip between the feeder roller 12F and the separator roller 12R. The feeder sensor 1FS detects a displacement of a sheet moved by the pickup roller 12P.

In use of the displacement sensor 400 as the feeder sensor IFS, the correction unit 434 times the correction of laser light amount of the light source 411 to coincide with when the pickup roller 12P enters the leading end of a sheet to be sent into the range RRG that the light source 411 irradiates with laser light. Thus, the light source 411 finishes changing laser light amount to a corrected value before the pickup roller 12P completes increase in conveyance speed of the sheet to the target value. As a result, the correction of laser light amount is reflected in the calculation by the displacement calculation unit 433.

Figure 16B:
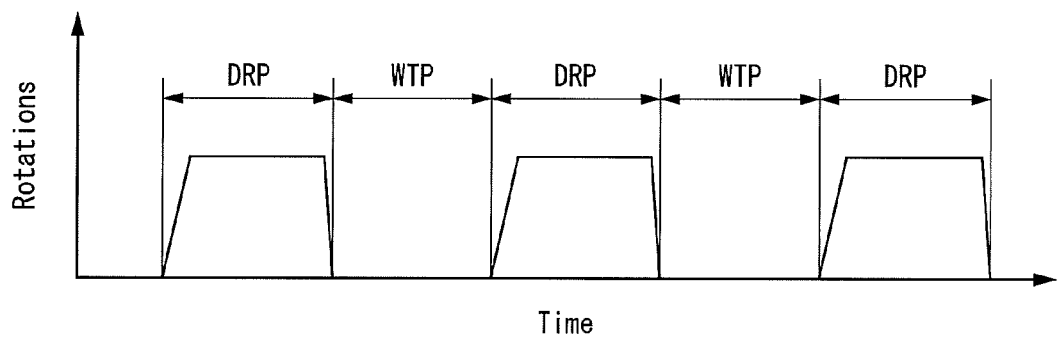
FIG. 16B is a graph showing temporal change in rotation speed of the feeder motor in FIG. 3.

FIG. 16B is a graph showing temporal change in rotation speed of the feeder motor M1 in FIG. 3. Referring to FIG. 16B, the feeder motor M1 alternates operating and idle periods at regular intervals. During the operating period DRP, the feeder motor M1 rotates the pickup roller 12P, the feeder roller 12F, and the separating roller 12R, and from the stack SHT of sheets in the paper cassette 11a, a sheet located at the top of the stack SHT is separated and transferred to the conveyance path. During the idle period WTP, the feeder motor M1 stops all the rollers 12P, 12F, and 12R, and the next sheet to be separated from the stack SHT of sheets in the paper cassette 11a stays at rest with its leading edge positioned below the feeder sensor 1FS. Accordingly, the correction unit 434 only has to correct the laser light amount within the idle period WTP.

Usually in the paper cassette 11a, sheets of the same paper type and the same size are stored and placed in the same position. In this condition, the correction unit 434 may correct an amount of laser light that the light source 411 should use for the first one of sheets to be fed, and may continuously allow the light source 411 to use the same corrected amount of laser light for others of the sheets, every time a job starts to be processed or every time the number of detections of displacements increases to a predefined value. When paper types can vary among sheets to be fed, such as sheets stored on the manual feed tray 16 or a document tray of the ADF 110, the correction unit 434 may correct an amount of laser light that the light source 411 should use for each of the sheets.

Use as Downstream Paper Sensor in Addition to Feeder Sensor

In the example shown in FIG. 3, a sheet detected by the feeder sensor 1FS is to be also detected by the timing sensor TS and the ejection sensor ES. Accordingly, when the displacement sensor 400 is used as the timing sensor TS or the ejection sensor ES in addition to the feeder sensor 1FS, the correction unit 434 of the feeder sensor 1FS, which obtains a corrected value of a laser light amount of the light source 411 from a single sheet, may allow the correction unit 434 of the other sensors TS, ES to use the same corrected value in detection of a displacement of the same sheet or in correction of an amount of laser light that the light source 411 should emit to the same sheet.

Use as Paper Sensor in Printer for Continuous Paper

Sheets that the MFP 100 processes are cut sheets. Alternatively, there are printers that can process continuous paper. Such a printer may use the displacement sensor 400 as follows.

Figure 16C:
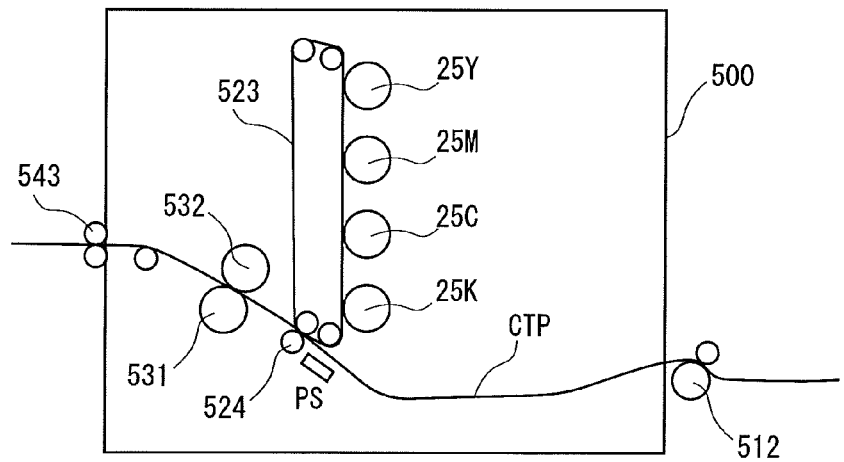
FIG. 16C is a schematic view showing an example of the displacement sensor mounted in a printer that should process continuous paper.

FIG. 16C is a schematic view showing an example of the displacement sensor 400 mounted in a printer 500 that processes continuous paper CTP. Referring to FIG. 16C, in the printer 500, the continuous paper CTP extends throughout a conveyance path, i.e. from the nip between feeder rollers 512 through the nip between an intermediate transfer belt 523 and a secondary transfer roller 524 and the nip between a fixing roller 531 and a pressure roller 532 to the nip between ejection rollers 543. This condition is usually maintained while a single job is processed.

In the example shown in FIG. 16C, a paper sensor PS is placed near the secondary transfer roller 524. When, as this paper sensor PS, the displacement sensor 400 is used, the correction unit 434 only has to correct a laser light amount of the light source 411 while the printer 500 is warming up, while image stabilization is being performed, or while portions of the intermediate transfer belt 523, except for portions including toner images, are in contact with the continuous paper CTP.

Supplement

Based on the above-described embodiment, the invention may be further characterized as follows.

The correction unit may determine a representative amount of reflected light from the distribution of amounts of reflected light that the detection unit detects, and then may use the representative value to correct an amount of laser light. In this case, the correction unit may acquire a desired value of movement speed of a target from the device equipped with the displacement detector; from the desired value of movement speed, the correction unit may estimates the degree of image deletion occurring in an image of the target indicated by the distribution of amounts of reflected light that the detection unit detects; according to the estimated value, the correction unit may determine an acceptable range for the representative amount of light reflected from the capture region; the correction unit may adjust the corrected amount of laser light to prevent the representative amount of reflected light from escaping the acceptable range. The correction unit may further determine the acceptable range such that, in the distribution of amounts of reflected light that the detection unit detects when the target remains stationary, lines connecting points where the reflected light amounts equal a predefined value are arranged at intervals larger than the estimated degree of the image deletion.

The detection unit may keep the size of the capture region constant. Alternatively, the correction unit may, depending on the steepness of the gradient of amounts of light reflected from the capture region, instruct the detection unit to change the size of the capture region.

An image forming device according to one aspect of the invention comprises a conveying unit configured to convey a sheet; an image forming unit with a rotatable image carrier, configured to produce a toner image on the image carrier, and transfer the toner image from the image carrier onto the sheet that the conveying unit conveys; a monitor unit including a displacement detector configured to determine a displacement or rotation angle of a target, which is a sheet conveyed by the conveying unit or the image carrier, the monitor unit configured to use the displacement detector to monitor the displacement or rotation angle of the target; and a controller unit configured to, based on the displacement or rotation angle that the monitor unit monitors, control the conveying unit or the image forming unit. The displacement detector comprises an emission unit configured to emit a variable amount of laser light to a predefined range in a space in which the target moves; a detection unit configured to set a capture region in the predefined range and detect a distribution of the amounts of light reflected from the capture region; a calculation unit configured to make the emission unit repeatedly emit laser light, make the detection unit repeatedly detect a distribution of amounts of reflected light, and based on a shift of speckle pattern indicated by a difference between the distributions of amounts of reflected light detected at different times, calculate a displacement of the target; and a correction unit configured to measure a speckle contrast from one of the distributions of amounts of reflected light and, based on an error between the measured value and a reference value, correct the amount of laser light to be emitted, the correction unit setting the reference value to the value of a speckle contrast in a case in which the amounts of light reflected from the capture region have a maximum no more than an upper limit of a detectable range of the detection unit and a minimum no less than a lower limit of the detectable range.

A sheet that the conveying unit conveys may be continuous paper. While the image forming unit warms up or performs image stabilization, or in an interval between transfers of toner images from the image carrier to sheets, the monitor unit may make the displacement detector correct the amount of laser light to be emitted.

A sheet that the conveying unit conveys may be a cut sheet. While the top end of the sheet is located within the capture region, the monitor unit may make the displacement detector correct the amount of laser light to be emitted. When separating a single sheet to be conveyed from cut sheets, the conveying unit may temporarily stop the single sheet and the monitor unit may make the displacement detector set the predefined range to which the emission unit emits laser light within a plane covered with the single sheet that the conveying unit temporarily stops, and during the stop of the single sheet, the monitor unit may make the displacement detector correct the amount of laser light to be emitted. The conveying unit may further convey two or more sheets one by one, and the monitor unit may make the displacement detector correct the amount of laser light to be emitted for each of the sheets. Alternatively, the controller unit may hold data specifying respective types of the sheets, and based on the data, the monitor unit may make the displacement detector correct the amount of laser light to be emitted for the top of each group with the same type of the sheets.

The monitor unit may include, in addition to a first detector that is the displacement detector, a second detector that has the same configuration as the displacement detector. The monitor unit may make the first detector correct the amount of laser light to be emitted to a first sheet passing through a portion of a path through which the conveying unit conveys sheets, and determine the displacement of the first sheet with the corrected amount of laser light; the monitor unit may make the second detector irradiate a second sheet passing downstream of the portion of the path with an amount of laser light depending on the amount of laser light corrected by the first detector, and determine the displacement of the second sheet.

What is claimed is:
1. A displacement detector for detecting a displacement of a target, which is a movable member mounted in a device equipped with the displacement detector, or an object carried by the device, the displacement detector comprising:
   an emission unit configured to emit a variable amount of laser light to a predefined range in a space in which the target moves;
   a detection unit configured to set a capture region in the predefined range and detect a distribution of amounts of light reflected from the capture region;
   a calculation unit configured to make the emission unit repeatedly emit laser light, make the detection unit repeatedly detect a distribution of amounts of reflected light, and, based on a shift of speckle pattern indicated by a difference between the distributions of amounts of reflected light detected at different times, calculate a displacement of the target; and
   a correction unit configured to measure a speckle contrast from one of the distributions of amounts of reflected light, and, based on an error between the measured value and a reference value, correct the amount of laser light to be emitted, the correction unit setting the reference value to the value of a speckle contrast in a case in which the amounts of light reflected from the capture region have a maximum no more than an upper limit of a detectable range of the detection unit and a minimum no less than a lower limit of the detectable range.

2. The displacement detector according to claim 1, wherein the correction unit determines a representative amount of reflected light from one of the distributions of amounts of reflected light, and then uses the difference between the representative amount and a representative value of the detectable range to correct the amount of laser light to be emitted.

3. The displacement detector according to claim 2, wherein:
   the correction unit acquires a desired value of movement speed of the target from the device equipped with the displacement detector;
   the correction unit estimates from the desired value of movement speed the degree of image deletion occurring in an image of the target indicated by one of the distributions of amounts of reflected light;
   according, to the estimated value, the correction unit determines an acceptable range for the representative amount of light reflected from the capture region; and the correction unit adjusts the corrected amount of laser light to prevent the representative amount of reflected light from leaving the acceptable range.

4. The displacement detector according to claim 3, wherein the correction unit determines the acceptable range such that, in a distribution of amounts of reflected light that the detection unit detects when the target remains stationary, lines connecting points where the amounts of reflected light equal a predefined value are arranged at intervals larger than the estimated degree of the image deletion.

5. The displacement detector according to claim 1, wherein the detection unit keeps the size of the capture region constant.

6. The displacement detector according to claim 1, wherein the correction unit, depending on the magnitude of a gradient of a distribution of amounts of light reflected from the capture region, instructs the detection unit to change the size of the capture region.

7. An image forming device comprising:
a conveying unit configured to convey a sheet;
an image forming unit with a rotatable image carrier, configured to produce a toner image on the image carrier, and transfer the toner image from the image carrier onto the sheet that the conveying unit conveys;
a monitor unit including a displacement detector configured to determine a displacement or rotation angle of a target, which is a sheet conveyed by the conveying unit or the image carrier, the monitor unit configured to use the displacement detector to monitor the displacement or rotation angle of the target; and
a controller unit configured to, based on the displacement or rotation angle that the monitor unit monitors, control the conveying unit or the image forming unit, wherein the displacement detector comprises:
an emission unit configured to emit a variable amount of laser light to a predefined range in a space in which the target moves;
a detection unit configured to set a capture region in the predefined range and detect a distribution of amounts of light reflected from the capture region;
a calculation unit configured to make the emission unit repeatedly emit laser light, make the detection unit repeatedly detect a distribution of amounts of reflected light, and based on a shift of speckle pattern indicated by a difference between the distributions of amounts of reflected light detected at different times, calculate a displacement of the target; and
a correction unit configured to measure a speckle contrast from one of the distributions of amounts of reflected light and, based on an error between the measured value and a reference value, correct the amount of laser light to be emitted, the correction unit setting the reference value to the value of a speckle contrast in a case in which the amounts of light reflected from the capture region have a maximum no more than an upper limit of a detectable range of the detection unit and a minimum no less than a lower limit of the detectable range.

8. The image forming device according to claim 7, wherein:
a sheet that the conveying unit conveys is continuous paper; and
while the image forming unit warms up or performs image stabilization, or in an interval between transfers of toner images from the image carrier to sheets, the monitor unit makes the displacement detector correct the amount of laser light to be emitted.

9. The image forming device according to claim 7, wherein:
a sheet that the conveying unit conveys is a cut sheet; and
while the top end of the sheet is located within the capture region, the monitor unit makes the displacement detector correct the amount of laser light to be emitted.

10. The image forming device according to claim 9, wherein:
the conveying unit conveys two or more sheets one by one; and
the monitor unit makes the displacement detector correct the amount of laser light to be emitted for each of the sheets.

11. The image forming device according to claim 9, wherein:
the conveying unit conveys two or more sheets one by one;
the controller unit holds data specifying respective types of the sheets; and
based on the data, the monitor unit makes the displacement detector correct the amount of laser light to be emitted for the top of each group with the same type of the sheets.

12. The image forming device according to claim 7, wherein:
sheets that the conveying unit conveys are cut sheets;
when separating a single sheet to be conveyed from the cut sheets, the conveying unit temporarily stops the single sheet; and
the monitor unit makes the displacement detector set the predefined range to which the emission unit emits laser light within a plane covered by the single sheet that the conveying unit temporarily stops, and during the stop of the single sheet, makes the displacement detector correct the amount of laser light to be emitted.

13. The image forming device according to claim 7, wherein:
the monitor unit includes, in addition to a first detector that is the displacement detector, a second detector that has the same configuration as the displacement detector;
the monitor unit makes the first detector correct the amount of laser light to be emitted to a first sheet passing through a portion of a path through which the conveying unit conveys sheets, and determine the displacement of the first sheet with the corrected amount of laser light; and
the monitor unit makes the second detector irradiate a second sheet passing downstream of the portion of the path with an amount of laser light depending on the amount of laser light corrected by the first detector, and determine the displacement of the second sheet.

* * * * *